United States Patent
Erdenee et al.

(10) Patent No.: US 12,475,881 B2
(45) Date of Patent: Nov. 18, 2025

(54) METHOD OF GENERATING CONVERSATION INFORMATION USING EXAMPLAR-BASED GENERATION MODEL AND APPARATUS FOR THE SAME

(71) Applicant: Hyperconnect LLC, Seoul (KR)

(72) Inventors: Enkhbayar Erdenee, Seoul (KR); Beom Su Kim, Seoul (KR); Seok Jun Seo, Seoul (KR); Sang Il Ahn, Cheongju-si (KR); Bu Ru Chang, Seoul (KR); Seung Ju Han, Seoul (KR)

(73) Assignee: Hyperconnect LLC, Dallas, TX (US)

( * ) Notice: Subject to any disclaimer, the term of this patent is extended or adjusted under 35 U.S.C. 154(b) by 267 days.

(21) Appl. No.: 17/805,191

(22) Filed: Jun. 2, 2022

(65) Prior Publication Data
US 2023/0077528 A1 Mar. 16, 2023

(30) Foreign Application Priority Data

Aug. 25, 2021 (KR) .......... 10-2021-0112545
Jan. 25, 2022 (KR) .......... 10-2022-0010973

(51) Int. Cl.
*G06F 40/30* (2020.01)
*G06F 18/2413* (2023.01)
*G06N 3/084* (2023.01)
*G10L 15/06* (2013.01)
*G10L 15/16* (2006.01)

(52) U.S. Cl.
CPC .......... *G10L 15/063* (2013.01); *G10L 15/16* (2013.01)

(58) Field of Classification Search
CPC ........ G06F 18/23; G06F 40/279; G06F 40/30; G06F 40/35; G06F 18/22; G06F 18/2413; G06N 3/084; G10L 15/16; G10L 15/18; G10L 15/1815
USPC ........ 704/1, 9, 232; 706/12, 25, 26; 707/728
See application file for complete search history.

(56) References Cited

U.S. PATENT DOCUMENTS

| | | | |
|---|---|---|---|
| 6,571,234 B1 | 5/2003 | Knight et al. |
| 6,731,307 B1 | 5/2004 | Strubbe et al. |
| 6,735,615 B1 | 5/2004 | Iwayama et al. |
| 6,804,647 B1 | 10/2004 | Heck et al. |
| 6,804,675 B1 | 10/2004 | Knight et al. |

(Continued)

FOREIGN PATENT DOCUMENTS

| | | | | |
|---|---|---|---|---|
| CA | 3216020 A1 * | 5/2024 | .......... | G06N 3/0475 |
| CN | 110633357 A | 12/2019 | | |

(Continued)

OTHER PUBLICATIONS

Yang et al., "A Hybrid Retrieval-Generation Neural Conversation Model", arXiv:1904.09068v1 [cs.IR], Apr. 19, 2019, 11 pgs.

(Continued)

*Primary Examiner* — Martin Lerner
(74) *Attorney, Agent, or Firm* — Patent Capital Group

(57) ABSTRACT

A training method of a conversation model according to various example embodiments of the present disclosure may include identifying a first context, identifying a first response set corresponding to the first context based on a first model, identifying a response subset selected from the first response set based on a gold response corresponding to the first context and training a second model based on the first context information and the response subset.

6 Claims, 13 Drawing Sheets

(56) References Cited

U.S. PATENT DOCUMENTS

| | | | |
|---|---|---|---|
| 7,277,855 | B1 | 10/2007 | Acker et al. |
| 7,685,237 | B1 | 3/2010 | Weaver et al. |
| 9,311,823 | B2* | 4/2016 | Byron ................. G09B 7/00 |
| 9,443,033 | B2* | 9/2016 | Lambert ............. G06F 16/90 |
| 10,140,977 | B1* | 11/2018 | Raux ................. G06N 3/084 |
| 10,176,819 | B2 | 1/2019 | Sun et al. |
| 10,853,580 | B1* | 12/2020 | Amrite ............... G06F 40/30 |
| 10,930,263 | B1 | 2/2021 | Mahyar |
| 10,963,792 | B1* | 3/2021 | Kim ................... G06N 3/084 |
| 11,081,104 | B1* | 8/2021 | Su ...................... G06F 40/30 |
| 11,418,461 | B1* | 8/2022 | Elfardy ............... G06F 40/56 |
| 11,615,777 | B2 | 3/2023 | Ahn et al. |
| 11,645,547 | B2 | 5/2023 | Tian et al. |
| 12,118,977 | B2 | 10/2024 | Ahn et al. |
| 2002/0120450 | A1 | 8/2002 | Junqua et al. |
| 2004/0111271 | A1 | 6/2004 | Tischer |
| 2005/0144247 | A1 | 6/2005 | Christensen et al. |
| 2006/0149558 | A1 | 7/2006 | Kahn et al. |
| 2006/0210034 | A1 | 9/2006 | Beadle et al. |
| 2006/0235932 | A1 | 10/2006 | Celi et al. |
| 2007/0005754 | A1 | 1/2007 | Horvitz et al. |
| 2007/0071206 | A1 | 3/2007 | Gainsboro et al. |
| 2008/0082333 | A1 | 4/2008 | Nurminen et al. |
| 2008/0147385 | A1 | 6/2008 | Nurminen et al. |
| 2008/0183473 | A1 | 7/2008 | Nagano et al. |
| 2008/0207242 | A1 | 8/2008 | Ekberg |
| 2008/0235024 | A1 | 9/2008 | Goldberg et al. |
| 2009/0037179 | A1 | 2/2009 | Liu et al. |
| 2009/0171657 | A1 | 7/2009 | Tian et al. |
| 2009/0177473 | A1 | 7/2009 | Aaron et al. |
| 2009/0204510 | A1 | 8/2009 | Hwang |
| 2010/0161327 | A1 | 6/2010 | Chandra et al. |
| 2011/0251468 | A1 | 10/2011 | Osorio |
| 2012/0030157 | A1* | 2/2012 | Tsuchida ........... G06F 40/295 |
| | | | 706/20 |
| 2012/0189272 | A1 | 7/2012 | Kunigita et al. |
| 2012/0226500 | A1 | 9/2012 | Balasubramanian et al. |
| 2013/0332167 | A1 | 12/2013 | Kilgore |
| 2014/0195227 | A1 | 7/2014 | Rudzicz et al. |
| 2014/0303958 | A1 | 10/2014 | Lee et al. |
| 2015/0379654 | A1 | 12/2015 | Deshmukh et al. |
| 2016/0005403 | A1 | 1/2016 | Agiomyrgiannakis et al. |
| 2016/0036962 | A1 | 2/2016 | Rand |
| 2016/0098992 | A1 | 4/2016 | Renard et al. |
| 2016/0104474 | A1 | 4/2016 | Bunn et al. |
| 2016/0203827 | A1 | 7/2016 | Leff et al. |
| 2016/0379643 | A1 | 12/2016 | Ito et al. |
| 2017/0171509 | A1 | 6/2017 | Huang et al. |
| 2017/0171599 | A1 | 6/2017 | Peng |
| 2017/0249953 | A1 | 8/2017 | Yassa et al. |
| 2017/0301340 | A1 | 10/2017 | Yassa et al. |
| 2018/0048865 | A1 | 2/2018 | Taylor et al. |
| 2018/0052818 | A1* | 2/2018 | Bethard ............... G06F 40/30 |
| 2018/0063556 | A1 | 3/2018 | Kalmanson et al. |
| 2018/0090126 | A1 | 3/2018 | Peterson et al. |
| 2018/0130471 | A1 | 5/2018 | Trufinescu et al. |
| 2018/0197106 | A1* | 7/2018 | Fujitani ............... G06N 20/00 |
| 2018/0204576 | A1 | 7/2018 | Dhoot et al. |
| 2018/0316964 | A1 | 11/2018 | Dillon et al. |
| 2019/0013017 | A1 | 1/2019 | Kang et al. |
| 2019/0044985 | A1 | 2/2019 | Jo et al. |
| 2019/0079941 | A1 | 3/2019 | Sarkar et al. |
| 2019/0108242 | A1 | 4/2019 | Liu et al. |
| 2019/0155905 | A1* | 5/2019 | Bachrach ............ G06F 40/284 |
| 2019/0221225 | A1 | 7/2019 | Bricklin et al. |
| 2019/0251952 | A1 | 8/2019 | Arik et al. |
| 2019/0334842 | A1 | 10/2019 | Sato |
| 2019/0354594 | A1 | 11/2019 | Foster et al. |
| 2020/0013422 | A1 | 1/2020 | Matkin |
| 2020/0082807 | A1 | 3/2020 | Kim et al. |
| 2020/0193085 | A1 | 6/2020 | Tanaka |
| 2020/0197810 | A1 | 6/2020 | Kung et al. |
| 2020/0265829 | A1 | 8/2020 | Liu et al. |
| 2020/0279017 | A1* | 9/2020 | Norton ................. G06F 40/30 |
| 2020/0334578 | A1* | 10/2020 | Ikeda ................... G06F 18/22 |
| 2020/0372898 | A1 | 11/2020 | Olabiyi et al. |
| 2020/0395008 | A1 | 12/2020 | Cohen et al. |
| 2021/0012199 | A1 | 1/2021 | Zhang et al. |
| 2021/0020161 | A1 | 1/2021 | Gao |
| 2021/0043187 | A1 | 2/2021 | Ahn et al. |
| 2021/0050002 | A1* | 2/2021 | Bastide ............... G06F 40/30 |
| 2021/0150284 | A1 | 5/2021 | Chiang et al. |
| 2021/0182489 | A1 | 6/2021 | Barkan et al. |
| 2021/0183369 | A1* | 6/2021 | Yamada .............. G06F 40/35 |
| 2021/0217404 | A1 | 7/2021 | Jia et al. |
| 2022/0083744 | A1* | 3/2022 | Li ........................ G06F 40/44 |
| 2022/0092651 | A1* | 3/2022 | Sureshkumar ......... G06F 40/30 |
| 2022/0199068 | A1 | 6/2022 | Ahn et al. |
| 2022/0246136 | A1 | 8/2022 | Yang et al. |
| 2022/0269934 | A1* | 8/2022 | Song ................... G06F 40/20 |
| 2022/0277141 | A1* | 9/2022 | Nijkamp .............. G06F 40/35 |
| 2022/0328038 | A1* | 10/2022 | Otani ................... G06F 40/35 |
| 2022/0358918 | A1* | 11/2022 | Kim ..................... G10L 15/30 |
| 2022/0382978 | A1* | 12/2022 | Wagner ............... G06F 40/284 |
| 2023/0080930 | A1 | 3/2023 | Seo et al. |
| 2023/0154453 | A1 | 5/2023 | Erdenee et al. |
| 2023/0195600 | A1 | 6/2023 | Clement et al. |
| 2023/0214697 | A1 | 7/2023 | Kim et al. |
| 2023/0215418 | A1 | 7/2023 | Ahn et al. |
| 2023/0229864 | A1 | 7/2023 | Kim et al. |
| 2023/0229964 | A1 | 7/2023 | Kim et al. |
| 2024/0078374 | A1* | 3/2024 | Song ..................... G06N 3/08 |
| 2024/0131439 | A1 | 4/2024 | Kim et al. |
| 2024/0144095 | A1 | 5/2024 | Farrar et al. |
| 2024/0152458 | A1 | 5/2024 | Ji |
| 2024/0226755 | A9 | 7/2024 | Kim et al. |

FOREIGN PATENT DOCUMENTS

| | | |
|---|---|---|
| CN | 111708871 A | 9/2020 |
| CN | 112541060 A | 3/2021 |
| CN | 117411109 A | 1/2024 |
| JP | H0772900 B2 | 8/1995 |
| JP | 2003202885 A | 7/2003 |
| JP | 2018004977 A | 1/2018 |
| JP | 2019179257 A | 10/2019 |
| JP | 2020160319 A | 10/2020 |
| KR | 20000036463 A | 7/2000 |
| KR | 20010091677 A | 10/2001 |
| KR | 20090028151 A | 3/2009 |
| KR | 101632435 B1 | 6/2016 |
| KR | 20170107683 A | 9/2017 |
| KR | 20180059322 A | 6/2018 |
| KR | 20190008137 A | 1/2019 |
| KR | 20190085882 A | 7/2019 |
| KR | 10-2170563 B1 | 10/2020 |
| KR | 10-2173553 B1 | 11/2020 |
| WO | 2018074516 A1 | 4/2018 |
| WO | 2019139430 A1 | 7/2019 |
| WO | 2019222591 A1 | 11/2019 |

OTHER PUBLICATIONS

Extended European Search Report for Application No. 20189677.6, Dated Sep. 28, 2020, 9 Pgs.

Extended European Search Report for Application No. 22189981.8, mailed Jan. 17, 2023, 9 pages.

Extended European Search Report for Application No. 22207004.7 dated Mar. 9, 2023, 9 pgs.

Japanese Office Action for Application No. 2020-134046, Dated Sep. 10, 2021, 8 Pgs.

Korean Office Action for Application No. 10-2019-0097398, Dated Aug. 18, 2021, 15 Pgs.

Korean Office Action for Application No. 10-2019-0097398, Dated Jun. 25, 2020, 11 Pgs.

Office Action for Japanese Patent Application No. 2021-083959 dated Sep. 28, 2022, 2 pages.

Choi et al., "Attentron: Few-Shot Text-to-Speech Utilizing Attention-Based Variable-Length Embedding", ArXiv abs/2005.08484, Aug. 12, 2020 (Version 2), 5 pages.

(56) References Cited

OTHER PUBLICATIONS

Choi et al., "Attentron: Few-Shot Text-to-Speech Utilizing Attention-Based Variable-Length Embedding", ArXiv abs/2005.08484, May 18, 2020 (Version 1), 5 pages.
Cooper et al., "Zero-Shot Multi-Speaker Text-to-Speech with State-of-the-Art Neural Speaker Embeddings", arXiv:1910.10838v2, Feb. 4, 2020, 5pgs.
Fu et al., "Stylistic Retrieval-based Dialogue System with Unparallel Training Data", arXiv:2109.05477, Sep. 12, 2021, 9 pages.
Han et al., "Meet Your Favorite Character: Open-domain Chatbot Mimicking Fictional Characters with only a Few Utterances", arXiv:2204.10825, Apr. 22, 2022, 19 pages.
Hsu et al., "Hierarchical generative modeling for controllable speech synthesis", arXiv preprint arXiv:1810.07217v2, Dec. 27, 2018, 27 pgs.
Kim et al., "Distilling the Knowledge of Large-scale Generative Models into Retrieval Models for Efficient Open-domain Conversation", Findings of the Association for Computational Linguistics, EMNLP 2021, Nov. 7-11, 2021, pp. 3357-3373.
Kim et al., "Sequence-Level Knowledge Distillation", Proceedings of the 2016 Conference on Empirical Methods in Natural Language Processing, Austin, TX, Nov. 1-5, 2016, pp. 1317-1327.
Lee et al., "Robust and Fine-Grained Prosody Control of End-to-End Speech Synthesis", arXiv:1811.02122v2, Feb. 18, 2019, 5pgs.
Zhang et al., "Dialogue Distillation: Open-Domain Dialogue Augmentation Using Unpaired Data", Proceedings of the 2020 Conference on Empirical Methods in Natural Language Processing, Nov. 16-20, 2020, pp. 3449-3460.
Adiwardana et al., "Towards a Human-like Open-Domain Chatbot", arXiv:2001.09977v3 [cs.CL], Feb. 27, 2020, 38 pgs.
Brown et al., "Language Models are Few-Shot Learners", arXiv:2005.14165v4 [cs.CL], Jul. 22, 2020, 75 pgs.
Cai et al., "Retrieval-guided Dialogue Response Generation via a Matching-to-Generation Framework", Proceedings of the 2019 Conference on Empirical Methods in Natural Language Processing and the 9th International Joint Conference on Natural Language Processing, Hong Kong, China, Nov. 3-7, 2019, pp. 1866-1875.
Cai et al., "Skeleton-to-Response: Dialogue Generation Guided by Retrieval Memory", arXiv:1809.05296v5 [cs.CL], Feb. 28, 2020, 8 pgs.
Fan et al., "Augmenting Transformers with KNN-Based Composite Memory for Dialog", Transactions of the Association for Computational Linguistics, vol. 9, Mar. 1, 2021, pp. 82-99, https://doi.org/10.1162/tacl_a_00356.
Gupta et al., "Controlling Dialogue Generation with Semantic Exemplars", Proceedings of the 2021 Conference of the North American Chapter of the Association for Computational Linguistics: Human Language Technologies, Jun. 6-11, 2021, pp. 3018-3029.
Guu et al., "REALM: Retrieval-Augmented Language Model Pre-Training", arXiv:2002.08909v1 [cs.CL], Feb. 10, 2020, 12 pgs.
Holtzman et al., "The Curious Case of Neural Text Degeneration", arXiv:1904.09751v2 [cs.CL], Feb. 14, 2020, 16 pgs.
Humeau et al., "Poly-Encoders: Architectures and Pre-Training Strategies for Fast and Accurate Multi-Sentence Scoring", International Conference on Learning Representations, Apr. 30, 2020, 14 pgs.
Lewis et al., "Retrieval-Augmented Generation for Knowledge-Intensive NLP Tasks", arXiv:2005.11401v4 [cs.CL], Apr. 12, 2021, 19 pgs.
Li et al., "A Diversity-Promoting Objective Function for Neural Conversation Models", Proceedings of NAACL-HLT 2016, San Diego, California, Jun. 12-17, 2016, pp. 110-119.
Li et al., "Don't Say That! Making Inconsistent Dialogue Unlikely with Unlikelihood Training", arXiv:1911.03860v2 [cs.CL], May 6, 2020, 15 pgs.
Liu et al., "How Not to Evaluate Your Dialogue System: An Empirical Study of Unsupervised Evaluation Metrics for Dialogue Response Generation", Proceedings of the 2016 Conference on Empirical Methods in Natural Language Processing, Austin, Texas, Nov. 1-5, 2016, pp. 2122-2132.
Mazare et al., "Training Millions of Personalized Dialogue Agents", arXiv:1809.01984v1 [cs.CL], Sep. 6, 2018, 5 pgs.
Papineni et al., "BLEU: a Method for Automatic Evaluation of Machine Translation", Proceedings of the 40th Annual Meeting of the Association for Computational Linguistics (ACL), Philadelphia, Jul. 2002, pp. 311-318.
Roller et al., "Recipes for building an open-domain chatbot", arXiv:2004.13637v2 [cs.CL], Apr. 30, 2020, 25 pgs.
Serban et al., "Multiresolution Recurrent Neural Networks: An Application to Dialogue Response Generation", arXiv:1606.00776v2 [cs.CL], Jun. 14, 2016, 21 pgs.
Welleck et al., "Neural Text Degeneration with Unlikelihood Training", arXiv:1908.04319v2 [cs.LG], Sep. 26, 2019, 17 pgs.
Weston et al., "Retrieve and Refine: Improved Sequence Generation Models for Dialogue", arXiv:1808.04776v2 [cs.CL], Sep. 6, 2018, 6 pgs.
Wu et al., "Response Generation by Context-aware Prototype Editing", arXiv:1806.07042v4 [cs.CL], Nov. 16, 2018, 9 pgs.
Zhang et al., "Dialogpt: Large-Scale Generative Pre-training for Conversational Response Generation", Proceedings of the 58th Annual Meeting of the Association for Computational Linguistics, Jul. 5-10, 2020, pp. 270-278.
Office Action for Japanese Patent Application No. 2022-103809 mailed Aug. 9, 2024, 4 pages.
"Launch of "Koestation," a smartphone app that uses voice synthesis to create an avatar of your own voice", Toshiba Digital Solutions Corporation, Apr. 17, 2018, 8 pages, obtained from https://www.global.toshiba/jp/company/digitalsolution/news/2018/0417.html.
"Trends in live streaming services (tipping, etc.)", Mitsubishi UFJ Research and Consulting, 64 pages, Dec. 14, 2018, obtained from https://www.caa.go.jp/policies/policy/consumer_policy/policy_coordination/internet_committee/pdf/internet_committee_190117_0002.pdf.
Fakoor et al., "Fast, Accurate, and Simple Models for Tabular Data via Augmented Distillation", Advances in Neural Information Processing Systems, 2020, vol. 33, pp. 8671-8681.
Gou et al., "Knowledge Distillation: A Survey", International Journal of Computer Vision 129.6, 2021, p. 1789-1819.

\* cited by examiner

FIG. 6

| Input Context | | | |
|---|---|---|---|
| What kind of animals you take care of? | | | |
| Gold Response | | | |
| I work with a variety of animals. I sometimes work with lions and monkeys. | | | |
| Context Retrieval | Sim | $P_\mathcal{R}(z, c)$ | Use? |
| I raise two dogs. | 0.1 | 0.9 | ✗ |
| kNE | Sim | $P_\mathcal{R}(z, c)$ | Use? |
| I work with a variety of animals. | 0.9 | 0.2 | ✗ |
| He works with various people. | 0.3 | 0.0 | ✓ |
| I work with lots of different animals. | 0.5 | 0.3 | ✓ |
| I like work with animals a lot, sometimes for work or fun. | 0.5 | 0.2 | ✓ |
| I do some work with animals they're amazing creatures. | 0.3 | 0.3 | ✓ |

| Model Names (A vs. B) | Appropriateness (%) | | | | Informativeness (%) | | | |
| --- | --- | --- | --- | --- | --- | --- | --- | --- |
| | Win Rate | A win | Tie | B win | Win Rate | A win | Tie | B win |
| RetNRef$_\alpha$ vs. Bi-encoder 256M | 44.9 | 32.0 | 28.7 | 39.3 | 47.5 | 31.3 | 34.0 | 34.7 |
| RetNRef$_\alpha$ vs. Blender 90M | 50.2 | 37.3 | 25.7 | 37.0 | 53.3 | 40.3 | 24.3 | 35.4 |
| RetNRef + CORGE vs. Bi-encoder 256M | 52.6 | 34.0 | 35.3 | 30.7 | 51.9 | 35.7 | 31.3 | 33.0 |
| RetNRef + CORGE vs. Blender 90M | 57.7* | 33.7* | 41.7* | 24.6* | 54.6 | 30.0 | 45.0 | 25.0 |
| RetNRef + CORGE vs. RetNRef$_\alpha$ | 53.2 | 30.3 | 43.0 | 26.7 | 51.6 | 27.7 | 46.3 | 26.0 |
| RetNRef + CORGE vs. RetNRef | 54.4 | 41.0 | 24.7 | 34.3 | 53.4 | 37.0 | 30.7 | 32.3 |
| RetNRef + CORGE vs. KIF | 57.5* | 37.0* | 35.7* | 27.3* | 50.0 | 30.0 | 40.0 | 30.0 |
| RetNRef + CORGE vs. RAG | 53.5 | 37.7 | 29.7 | 32.6 | 52.1 | 29.7 | 43.0 | 27.3 |
| MatToGen vs. Bi-encoder 256M | 47.1 | 33.3 | 29.3 | 37.4 | 50.9 | 36.7 | 28.0 | 35.3 |
| MatToGen vs. Blender 90M | 48.1 | 34.0 | 29.3 | 36.7 | 46.3 | 31.6 | 31.7 | 36.7 |
| MatToGen + CORGE vs. Bi-encoder 256M | 54.2 | 43.0 | 20.7 | 36.3 | 54.4 | 41.3 | 24.0 | 34.7 |
| MatToGen + CORGE vs. Blender 90M | 58.0* | 35.0* | 39.7* | 25.3* | 58.1* | 36.0* | 38.0* | 26.0* |
| MatToGen + CORGE vs. MatToGen | 52.6 | 33.3 | 36.7 | 30.0 | 53.3 | 32.7 | 38.7 | 28.6 |
| MatToGen + CORGE vs. KIF | 57.1* | 44.0* | 23.0* | 33.0* | 52.5 | 39.0 | 25.7 | 35.3 |
| MatToGen + CORGE vs. RAG | 51.6 | 38.3 | 25.7 | 36.0 | 55.6 | 41.3 | 25.7 | 33.0 |

FIG. 10

| Models | PPL$_{gold}$ | PPL$_{retrieve}$ | Dist-2 | Dist-3 | BLEU-2 | BLEU-3 |
|---|---|---|---|---|---|---|
| Blender 90M | 13.79 | 13.79 | 0.236 | 0.372 | - | - |
| Bi-encoder 256M | - | - | 0.681 | 0.881 | - | - |
| RetNRef | 8.518 | 13.37 | 0.256 | 0.386 | 0.030 | 0.009 |
| RetNRef$_\alpha$ | 3.061 | 16.99 | 0.530 | 0.778 | 0.319 | 0.201 |
| RetNRef + CORGE | 4.863 | 11.53 | 0.349 | 0.520 | 0.102 | 0.048 |
| MatToGen | 5.291 | 17.71 | 0.362 | 0.567 | 0.169 | 0.095 |
| MatToGen + CORGE | 5.651 | 13.45 | 0.313 | 0.474 | 0.069 | 0.028 |
| RAG | 11.84 | 14.91 | 0.257 | 0.390 | 0.015 | 0.003 |
| KIF | 12.11 | 15.18 | 0.238 | 0.363 | 0.002 | 0.000 |

| Models | PPL$_{gold}$ | PPL$_{retrieve}$ | Dist-2 | Dist-3 | BLEU-2 | BLEU-3 |
|---|---|---|---|---|---|---|
| RetNRef + CORGE | 4.863 | 11.53 | 0.349 | 0.520 | 0.102 | 0.048 |
| RetNRef + CORGE − RS | 6.482 | 11.75 | 0.316 | 0.478 | 0.074 | 0.031 |
| RetNRef + CORGE − kNE | 8.657 | 13.82 | 0.250 | 0.380 | 0.034 | 0.010 |
| RetNRef + CORGE − JF | 1.698 | 32.91 | 0.537 | 0.785 | 0.332 | 0.207 |

FIG. 11

| Input Context | A: No way i do it a lot, at least when i am feeling well enough.<br>B: Awesome. That's the only thing i'll never do. I do like the outdoors though.<br>A: I'm a thrill seaker. Do you like extreme sports? |
|---|---|
| Bi-encoder 256M<br>Blender 90M | I love extreme sports. Its the only real way I can get the adrenaline boost I need.<br>No, I don 't think I' ve ever done that. I' d love to though. |
| Exemplar<br>RetNRef | I love extreme sports. Its the only real way I can get the adrenaline boost I need.<br>I don' t really have a lot of time for sports. I spend most of my free time working. |
| Exemplar<br>RetNRef$_\alpha$ | I love extreme sports. Its the only real way I can get the adrenaline boost I need.<br>I love extreme sports I need the adrenaline boost. Its the only way I can get the real adrenaline. |
| Exemplar<br>RetNRef + CORGE | I love extreme sports. Its the only real way I can get the adrenaline boost I need.<br>I love extreme sports as well. It' s a great way to get out and enjoy life. |
| Exemplar<br>KIF | nicde.<br>I don' t really have a lot of time for sports. I spend most of my time working. |
| Exemplar<br>RAG | Do you like sports?<br>I don' t really have a lot of time for sports. I spend most of my time working. |

METHOD OF GENERATING CONVERSATION INFORMATION USING EXAMPLAR-BASED GENERATION MODEL AND APPARATUS FOR THE SAME

CROSS-REFERENCE TO RELATED APPLICATION(S)

This application claims the benefit of Korean Patent Application No. 10-2022-0010973, filed on Jan. 25, 2022, in the Korean Intellectual Property Office, and Korean Patent Application No. 10-2021-0112545, filed on Aug. 25, 2021, in the Korean Intellectual Property Office, the disclosures of which are incorporated herein by reference.

BACKGROUND

1. Field of the Invention

Example embodiments of the invention relate to a method and an apparatus for generating conversation information using an exemplar-based generation model.

2. Description of the Related Art

Artificial intelligence (AI) is being used in various industries. AI, which operates in a manner similar to human thinking, may be utilized to extract features of objects that a sample object is intended to approximate.

In the field of open-domain conversation, a chatbot may be created to lead a natural conversation without a specific topic of conversation. AI models used in the field of open-domain conversation are largely differentiated as either a generation-based conversation model or a search-based conversation model (hereinafter, the expression "retrieval-based conversation model" will be used to describe the search-based conversation model).

The generation-based conversation model generates a response appropriate to conversation context by using extracted and input conversation context based on a "sequence to sequence" architecture. In a retrieval-based conversation model, where a response set is predefined to include potential high-priority responses, a response most suitable for the input conversation context is retrieved from the response set and returned as the response.

The generation-based conversation model has the advantage of generating a fluent response suitable for given conversation context based on rich knowledge of the language model when a large-scale language model is used together. However, the generation-based conversation model tends to generate flat and uninteresting responses that do not interrupt the flow of conversation, in order to generate as natural a response as possible.

On the other hand, the retrieval-based conversation model may extract heterogeneous responses that may not match the identified or input conversation context, but has the advantage of providing more diverse and interesting responses as compared to the generation-based conversation model. In addition, when used with a high-performance search library (for example, FAISS), there is an advantage in that it is possible to more quickly extract a response suitable to conversation context as compared to the generation-based conversation model.

Therefore, in order to take advantage of the benefits of both models, namely the advantage of the natural response generation ability of the generation-based conversation model and the advantage of generating a variety of interesting responses of the retrieval-based conversation model, there have been proposed exemplar-based generation models that provide responses extracted by a retrieval-based conversation model to a given conversation context as exemplars of the generation-based conversation model, and a generation-based conversation model that generates the given exemplars as more natural responses.

SUMMARY

In existing exemplar-based generative models, there may be a case where a retrieval-based conversation model does not utilize a response extracted and provided, and ignores it, or a case where the same response is provided as it is without considering a given exemplar. In addition, the existing exemplar-based generative models that have been previously proposed tend to be biased in learning cases in which descriptions are detailed in time order.

Therefore, there is provided an exemplar-based generation model according to example embodiments of the invention, to generate more varied and fluent responses by which a method of generating conversation overcomes the above-described problems and given responses are appropriately used.

According to an embodiment of the invention, there is provided a method of training a conversation model in an electronic apparatus, the method including at least one of identifying a first context, identifying a first response set corresponding to the first context based on a first model, identifying a response subset selected from the first response set based on a gold response corresponding to the first context, and training a second model based on the first context information and the response subset.

The response subset may be selected from among candidate responses identified based on the gold response and a clustering algorithm.

The response subset may be selected by excluding at least one response corresponding to being within a specific range from a value corresponding to the gold response among the candidate responses in an embedding space.

The method may further include determining a set of weights by setting a weight based on the first context for each response included in the response subset, and the training of the second model may include training the second model based on the set of weights.

Each weight of the set of weights may be set based on a relevance score for each response in the response subset, and the relevance score for the response may be calculated based on a value corresponding to the first context and a value corresponding to the response in an embedding space.

The second model may identify a second context for a conversation obtained from a user and provide a gold response for the second context based on the second context.

The first context may include one or more conversations obtained from a user.

The second model may be trained by performing a backpropagation operation using a loss function calculated based on the set of weights, and each weight of the set of weights may be calculated by normalizing a relevance score for each response.

Additional aspects of example embodiments will be set forth in part in the description which follows and, in part, will be apparent from the description, or may be learned by practice of the disclosure.

The method of generating conversation using the exemplar-based generation model according to the example embodiments includes learning to extract a response suitable for the context of a conversation based on the combination of a retrieval model 200 and a generation model 201, and thus a fluent response suitable for a given conversation context may be generated based on rich knowledge, and at the same time, the effect of generating a variety of interesting responses may be provided.

The electronic apparatus according to some example embodiments excludes responses within a range too close (or highly correlated) to a value corresponding to a gold response in an embedding space from among candidate exemplars, and thus the electronic apparatus helps the generation model 201 to learn to derive various responses appropriate to context.

The electronic apparatus according to the example embodiments may induce generating fluent and creative responses and at the same time, provide responses that are appropriate to context and not awkward by appropriately reflecting exemplars, by learning to generate an optimal response by further identifying exemplars and weight for each exemplar, and may induce a conversation that a user using the conversation model does not get tired of.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 6 illustrates an example of a result of an operation for learning a conversation and a response of a retrieval model according to example embodiments;

FIGS. 9 to 12 illustrate comparisons of the performance of an open-domain conversation model of an electronic apparatus according to example embodiments to performances of other open-domain conversation models.

DETAILED DESCRIPTION

Figure 1:
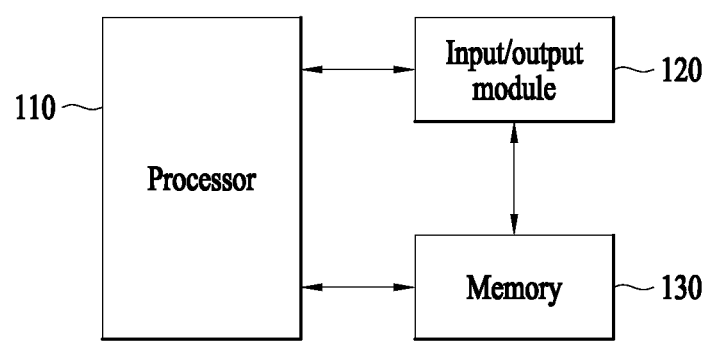
FIG. 1 is a schematic block diagram illustrating a configuration of an electronic apparatus according to various example embodiments of the present disclosure.

Terms used for the example embodiments were selected as currently widely used general terms when possible while considering functions in the present disclosure, but the terms may vary according to the intention of a person skilled in the art, precedents and emergence of new technologies. In addition, in some specific cases, there are also terms arbitrarily selected by the applicant, and in such cases, meanings will be described in detail in the corresponding descriptions. Therefore, the terms used in the present disclosure should be defined based on the meaning of the terms together with the contexts through the present disclosure, rather than the simple names of the terms.

In the entire specification, when a part "includes" a certain configuration, it indicates that other configurations may be further included, rather than excluding other configurations, unless otherwise stated. Further, terms such as " . . . part" and " . . . module" described in the specification refer to a part that processes at least one function or operation, and may be implemented as hardware or software, or may be implemented as a combination of hardware and software.

The expression "at least one of a, b and c" described throughout the specification may include "a alone," "b alone," "c alone," "a and b," "a and c," "b and c" or "all of a, b and c."

The "terminal" referred to below may be implemented as a computer or portable terminal that may access a server or other terminal through a network. Herein, the computer includes, for example, a laptop on which a web browser is mounted, a desktop, a laptop, etc. A portable terminal is a wireless communication device that guarantees portability and mobility, and may include, for example, all types of handheld-based wireless communication devices such as terminals and smart phones, and PCs based on communications such as International Mobile Telecommunication (IMT), Code Division Multiple Access (CDMA), W-Code Division Multiple Access (W-CDMA), Long Term Evolution (LTE), etc.

Hereinafter, example embodiments of the present disclosure will be described in detail with reference to the accompanying drawings so that those of ordinary skill in the art to which the present disclosure pertains may easily implement the example embodiments. However, the present disclosure may be implemented in many different forms and is not limited to the example embodiments described herein.

Hereinafter, example embodiments of the present disclosure will be described in detail with reference to the accompanying drawings.

In describing the example embodiments, descriptions of technical contents that are well known in the technical field to which the present disclosure pertains and that are not directly related to the present disclosure will be omitted. This is to more clearly convey the gist of the present disclosure without obscuring the gist of the present disclosure by omitting unnecessary description.

For the same reason, some elements are exaggerated, omitted or schematically illustrated in the accompanying drawings. In addition, the size of each element does not fully reflect the actual size. In each figure, the same or corresponding elements are assigned the same reference numerals.

Advantages and features of the present disclosure, and a method of achieving the advantages and the features will become apparent with reference to the example embodiments described below in detail together with the accompanying drawings. However, the present disclosure is not limited to the example embodiments disclosed below, and may be implemented in various different forms. The example embodiments are provided only so as to render the present disclosure complete, and provide sufficient disclosure to those of ordinary skill in the art to which the present disclosure pertains. The present disclosure is only defined by the scope of the claims. Like reference numerals refer to like elements throughout.

At this time, it will be understood that each block of a flowchart diagram and a combination of the flowchart diagrams may be performed by computer program instructions. The computer program instructions may be embodied in a processor of a general-purpose computer or a special purpose computer, or may be embodied in a processor of other programmable data processing equipment. Thus, the instructions, executed via a processor of a computer or other programmable data processing equipment, may generate a part for performing functions described in the flowchart blocks. To implement a function in a particular manner, the computer program instructions may also be stored in a computer-usable or computer-readable memory that may direct a computer or other programmable data processing equipment. Thus, the instructions stored in the computer usable or computer readable memory may be produced as an article of manufacture containing an instruction part for performing the functions described in the flowchart blocks. The computer program instructions may be embodied in a computer or other programmable data processing equipment. Thus, a series of operations may be performed in a computer or other programmable data processing equipment to create a computer-executed process, and the computer or other programmable data processing equipment may provide steps for performing the functions described in the flowchart blocks.

Additionally, each block may represent a module, a segment, or a portion of code that includes one or more executable instructions for executing a specified logical function(s). It should also be noted that in some alternative implementations the functions recited in the blocks may occur out of order. For example, two blocks shown one after another may be performed substantially at the same time, or the blocks may sometimes be performed in the reverse order according to a corresponding function.

AI may be a type of computer program that mimics human intelligence through a series of logical algorithms that think, learn and judge like humans. So-called AI may process complex calculations in a processor corresponding to a human brain through a neural network that resembles the human nervous system. In this specification, a process of normalizing and modeling a feature through machine learning and other learning that may be included in deep learning will be described. In this specification, the terms machine learning and apparatus learning may be used interchangeably.

The neural network may refer to a network in which an operation principle of a neuron, which is a basic unit of a human nervous system, and a connection relationship between neurons are modeled. The neural network may be a data processing system that connects individual nodes or processing elements in the form of layers. The neural network may include a plurality of layers, and each layer may include a plurality of neurons. In addition, the neural network may include a synapse corresponding to a nerve stimulator capable of transmitting data between neurons.

Specifically, the neural network may refer to a data processing model in which artificial neurons change the binding strength of synapses through repetitive learning and have the ability to solve a given problem or a problem in which a variable is generated, as a whole. In the specification, the terms neural network and artificial neural network may be used interchangeably.

The neural network may be trained using training data. Specifically, the training may include a process of determining parameters of a neural network using feature data to achieve purposes such as classification, regression and clustering of input data. More specifically, a weight or a bias may be a factor to determine a parameter.

The neural network may train input data to classify or cluster the input data according to a pattern, and the trained neural network may be referred to as a trained model. Specifically, a training method may be divided into supervised learning, unsupervised learning, semisupervised learning and reinforced learning. More specifically, the supervised learning may be a method of machine learning for inferring functions from training data. Outputting consecutive result values among inferred functions through the machine learning may be regression analysis, and outputting a result value by predicting a class of input data may be classification.

In supervised learning, a label may be given to training data, and the label may include a meaningful result value that the neural network may infer. Specifically, the result value to be inferred by the neural network may be labeling data. More specifically, the training data and the labeling data corresponding to the training data may be configured as one training set, and the neural network may obtain an input value in the form of training set.

The training data may include a plurality of feature vectors, and the neural network may label individual feature vectors from the training data to output the labeling data as a result value. The neural network may learn a function for the correlation between each data through the training data and the labeling data. In addition, parameters for individual vectors may be optimized through feedback on a function learned by the neural network.

The exemplar-based generation model for open-domain conversation and a method of improving the exemplar-based generation model in accordance with various embodiments of the invention will be described.

The exemplar-based generation model generates responses based on exemplars extracted by a retrieval model, and uses a generation model and the retrieval model. An electronic apparatus according to the example embodiments described in this specification includes an exemplar-based generation model in which the generation model and the retrieval model are connected or combined. Previously existing exemplar-based generative models may often ignore a retrieved sample during response generation or generate a response overfitted to the retrieved sample. Accordingly, the electronic apparatus according to the example embodiments includes a conversation response training model that connects the retrieval model and the generation model, and the electronic apparatus according to the example embodiments may perform some or all of the operations of training the exemplar-based generation model. In training the exemplar-based generation model, the electronic apparatus according to the example embodiments may use a query for selecting an exemplar by using a gold response as well as context. Thereafter, the electronic apparatus according to the example embodiments may exclude an exemplar that is too similar to the gold response in order to alleviate the above-described overfitting problem. Since some of the remaining exemplars may not be related to a given context, the electronic apparatus according to example embodiments may train a generation model by additionally using a relevance score between the context and the exemplar.

The gold response according to example embodiments may indicate, for example, an optimal response for specific context, an appropriate response, or a preset response and, for example, the gold response may be a response set to be used in supervised training of data.

FIG. 1 is a schematic block diagram illustrating a configuration of an electronic apparatus according to various example embodiments of the present disclosure.

The electronic apparatus may include an apparatus including a neural network. The electronic apparatus is an apparatus that may perform machine learning using training data, and may include an apparatus that may perform learning using a model composed of a neural network. For example, the electronic apparatus may be configured to receive, classify, store and output data to be used for data mining, data analysis, intelligent decision-making, and machine learning algorithms.

The electronic apparatus may include various apparatuses for training a neural network. For example, the electronic apparatus may be implemented as a plurality of server sets, a cloud server, or a combination thereof. Specifically, the electronic apparatus may obtain a result value through data analysis or training through distributed processing.

Referring to FIG. 1, an electronic apparatus may include a processor 110, an input/output module 120 and a memory 130 as components. The components of the electronic apparatus illustrated in FIG. 1 are not limited thereto, and may be added or replaced.

The processor 110 may control or predict the operation of the electronic apparatus through data analysis and machine learning algorithms. The processor 110 may request, search, receive or utilize data to be trained, and the processor 110 may control the electronic apparatus to execute a desired operation learned through training. The processor 110 may include, for example, a learning processor according to example embodiments that requests, retrieves, receives or utilizes learning data, example embodiments of pre-processing them, or example embodiments of performing learning using them.

The processor 110 may be configured to derive and detect a result value for an input value based on a user input or natural language input. The processor 110 may include, for example, a learning processor according to example embodiments configured to collect data for processing and storage. The collection of data may include sensing data through a sensor, extracting data stored in the memory 130, or receiving data from an external apparatus through the input/output module 120.

The processor 110 may convert the operation history of the electronic apparatus into data and store it in the memory 130. The processor 110 may obtain the best result value for performing a specific operation based on the stored operation history data and a trained model.

When a specific operation is performed, the processor 110 may analyze a history according to the execution of the specific operation through data analysis and machine learning algorithms. Specifically, the processor 110 may update previously trained data based on the analyzed history. That is, the processor 110 may improve the accuracy of data analysis and the machine learning algorithms based on the updated data.

For example, the processor 110 or the learning processor included in the processor 110 according to the example embodiments may train a neural network using training data or a training set. For example, the processor 110 or the learning processor included in the processor 110 may train the neural network through data obtained by preprocessing the obtained input value. As another example, the processor 110 or the learning processor included in the processor 110 may train the neural network through preprocessing data stored in the memory 130. Specifically, the processor 110 or the learning processor included in the processor 110 may determine an optimization model of the neural network and parameters utilized for optimization by repeatedly training the neural network using various training methods.

The input/output module 120 may perform a function of transmitting data stored in the memory 130 of the electronic apparatus or data processed by the processor 110 to another apparatus, or receiving data from another apparatus to the electronic apparatus. The input/output module 120 may include, for example, a receiver, transmitter, or a transceiver that receives data from or transmits data to another electronic apparatus. Furthermore, the input/output module 120 according to example embodiments may include one or more input/output modules for receiving or outputting electronic signals or data from components or apparatuses physically or logically connected to the electronic apparatus.

The memory 130 may store a model trained in the processor 110 or the neural network. For example, the memory 130 may classify and store a trained model or a model under training. Specifically, the memory 130 may store models of a process in which the neural network is trained, in order to store a trained model according to the training history.

For example, the memory 130 according to the example embodiments may include a model storage and/or a database.

For example, the model storage may store a model being trained or already trained through the processor 110 (for example, a neural network model). Further, the model storage may store an updated model of the trained model.

For example, the database may store input data that is an input value, training data for model training, data of model training history, and the like. The input data stored in the database may be processed data suitable for model training or raw data that is not processed.

The processor 110 according to the example embodiments may perform identifying a first context, identifying a first response set corresponding to the first context based on a first model, identifying a response subset selected from the first response set based on a gold response corresponding to the first context, and training a second model based on the first context information and the response subset.

This specification proposes a simple training method to solve the general shortcomings of exemplar-based generative models used in open-domain conversations. In order to generate responses in two ways, previous exemplar-based generative models combine a retrieval model and a generative model into one framework. First, a retriever (a retrieval model) retrieves an exemplar using a given context as a query, and a generator (a generation model) generates a response based on the given context and the exemplar. The exemplar-based generative models generate more specific responses than generation models, and produce more fluent responses than retrieval models.

Despite the success of these exemplar-based generative models, the existing models have two drawbacks. As shown below in FIG. 3, primitive exemplar-based generative models (such as in example (a) in FIG. 3) tend to ignore exemplars entirely, and look similar to a vanilla generation model. This is caused by a one-to-many problem in which an exemplar retrieved from presented context in a training phase is significantly different from a gold response. To alleviate this problem, some exemplar-based generative models have utilized a gold response (such as in example (b) in FIG. 3) or a perturbed gold response as an exemplar within the training phase. However, in such training methods, a generator may excessively depend on a retrieved exemplar (such as in example (b) in FIG. 3) and the generation model may improperly use provided tokens. The two disadvantages may adversely affect the quality of generated responses.

This specification proposes a model that may alleviate such shortcomings by providing exemplars that are semantically related but reasonably distant from a gold response in the process of training an exemplar-based generation model. The proposed model according to many embodiments of the invention is a conversation response training model, and as one training method, it proposes a method of selecting appropriate exemplars. First, the conversation response training model according to the example embodiments may utilize a gold response to select exemplars that are similar but not lexicographically identical to a gold response. However, a selected exemplar may not be meaningful within the given context, and in that case, the gold response may be simply used instead. Accordingly, the conversation response training model may calculate a relevance score of the context and the exemplar. Then the conversation response training model uses the score to weight similar exemplars and penalize exemplars that are dissimilar to the given context. The conversation response training model is natively applicable to exemplar-based generation models, and improves the quality of generated responses in terms of appropriateness and informativeness.

In other words, the existing exemplar-based generative models tend to over-rely on or ignore exemplars extracted and selected from a retrieval model. That is, the existing exemplar-based generative models may generate a response that is overfitted to an exemplar extracted and selected from a retrieval model, or may not reduce the frequency of generating a response irrelevant to an extracted and selected exemplar.

Figure 2:
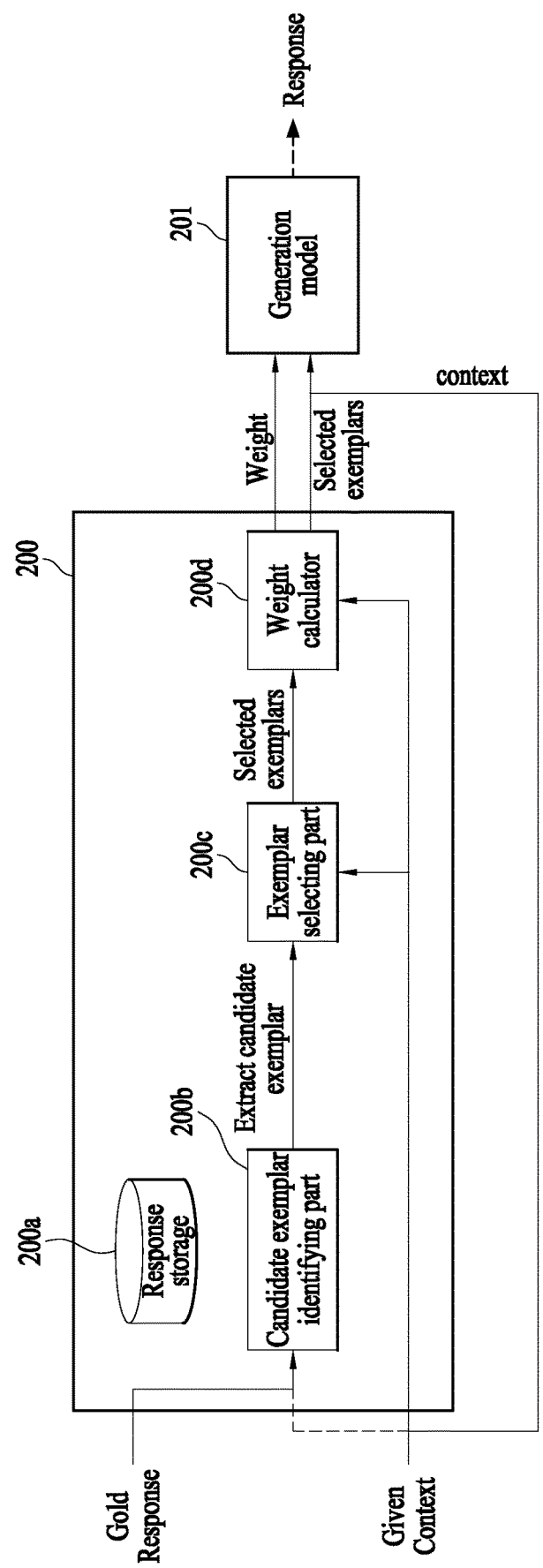
FIG. 2 illustrates a portion of a configuration diagram of an electronic apparatus according to example embodiments.

By contrast, the model according to many embodiments of the invention (for example, a model according to the combination of the retrieval model 200 and the generation model 201 in FIG. 2) may have a configuration improved from an existing retrieval model (for example, the retrieval model 200 in FIG. 2). The model may further perform an operation to remove exemplars from among extracted and selected exemplars that are likely to generate overfitted responses, and/or an operation to revalidate exemplars by applying weight based on a relevance score of an exemplar. With the configuration, the model according to a number of embodiments of the invention (for example, the model according to the combination of the retrieval model 200 and the generation model 201 in FIG. 2) may maximize the learning efficiency of the generation model by preventing the generation of a response overfitted to an exemplar extracted and selected from the retrieval model, and by reducing the frequency of generating responses that are not related to the extracted and selected exemplar, and the model may provide the effect of helping to continue a natural conversation.

Accordingly, this specification describes the following contributions or suggestions, and proposes the construction of improved embodiments of an exemplar-based generation model for performing the following contributions or suggestions (for example, the combination of the retrieval model 200 and the generation model 201 of FIG. 2).

1) The specification shows that existing exemplar-based generative models either ignore exemplars or generate responses that are overfitted to exemplars.
2) The conversation response training model, the training method disclosed in this specification, alleviates the above-mentioned shortcomings by selecting appropriate exemplars and applying weights to exemplars or a relevance score evaluated by the retrieval model.
3) Human evaluation results show that the conversation response training model dramatically improves the performance of exemplar-based generation models in terms of appropriateness and informativeness.

In relation to the training method of the conversation response training model disclosed in the specification, an exemplar-based generation model will be described.

While generation models have shown successful performances in open-domain conversations, the generation models are well known for their lack of information and bland responses. Exemplar-based generation models in accordance with many embodiments of the invention overcome the above-mentioned problems posed by the generation models. Existing exemplar-based generative models for open-domain conversation may retrieve context-model pairs conditional according to input context and encode lexical differences between the input context and retrieved context into an edit vector. A response is generated by feeding the exemplars and the edit vector. Some existing methods retrieve an exemplar using a presented context as a query, concatenate the exemplar and the context, and feed generators with the concatenated exemplar to generate a final response for open-domain conversation. In other models, exemplars with masking are used to remove extraneous information from exemplars and inform a generator to generate a response. A generator may also be controlled with retrieved exemplars and extracted semantic frames of the exemplars.

In summary, an electronic apparatus according to the example embodiments may perform the training method performed in the conversation response training model described above. Unlike the existing exemplar-based generative models, the electronic apparatus according to many example embodiments of the invention avoids ignoring a selected exemplar or generating a response overfitted to the selected exemplar, by selecting a similar but somewhat distant exemplar and by applying weight via calculating a relevance score for selected exemplars. A detailed configuration of the electronic apparatus according to the example embodiments will be described with reference to FIG. 2, a process in which the electronic apparatus according to the example embodiments generates a correct response is described with reference to FIGS. 3 to 8, FIGS. 9 to 12 show advanced effects on performances of the electronic apparatus according to the example embodiments, and FIG. 13 shows an example of a method of calculating a relevance score according to the example embodiments.

FIG. 2 illustrates a portion of a configuration diagram of the electronic apparatus according to the example embodiments.

Specifically, FIG. 2 illustrates a configuration or a set of instructions for the electronic apparatus according to the example embodiments to learn an AI model for open-domain conversation. The electronic apparatus according to the example embodiments may represent a part or all of an exemplar-based generation model for open-domain conversation. In the electronic apparatus according to the example embodiments, the retrieval model 200 according to the example embodiments receives context for a conversation and a gold response corresponding to the context, and learns them. The electronic apparatus according to the example embodiments may include an AI model that learns the above information, receives conversation (and/or context), and predicts or generates a response to the corresponding the conversation.

In this specification, the following notation will be used to describe the structure and operations of the exemplar-based generation model, and problems of the existing models will be described.

$D=\{(c_i,r_i)|1\le i\le n\}$ represents a dialog dataset, and consists of n pairs of context c and response r. The exemplar-based generation model may include two elements. One is a retriever $\mathcal{R}$ and a generator $\mathcal{G}$. Regarding $c_i$ in a given context, the retriever identifies a top-scoring exemplar, given relevance scores $S_{\mathcal{R}}(z,c_i)$ of exemplars $z \in R$ in a pre-defined response set R. The generator calculates the probability of a response $P_{\mathcal{G}}(r|c_i,z)$ to $c_i$ of the context by using exemplar z.

Here, the retriever may be referred to as, for example, a retrieval model, and the generator may be referred to as, for example, a generation model.

For example, one exemplar may be expressed (or embedded) as a list or vector of data having a plurality of dimensions, and thus one exemplar may be represented by one or more locations in an embedding space. Similarly, the context according to the example embodiments may also be expressed (or embedded) as a list or vector of data having a plurality of dimensions, and may be expressed as one or more locations in an embedding space.

A relevance score according to the example embodiments $S_{\mathcal{R}}(z,c_i)$ may indicate an index that shows a correlation between at least two exemplars or a correlation between a context and a specific exemplar. For example, a relevance score may indicate relevance between two exemplars (or one exemplar and one context) located in an embedding space.

Meanwhile, the concept of "relevance" described in this specification is a concept that may indicate the distance between two vectors, the degree of density, similarity, etc., based on values of the embedded vectors of the two exemplars located in the embedding space.

Here, $\mathcal{R}$ may indicate the retrieval model that identifies and stores a plurality of exemplars expressed in the embedding space. $c_i$ may represent context according to the example embodiments, and z may indicate one among a plurality of exemplars according to the example embodiments.

An example of a method of calculating a relevance score according to the example embodiments is shown in FIG. 13. Further, for example, referring to FIG. 2, the electronic apparatus according to the example embodiments may include the retrieval model 200 and a generation model 201.

The generation model 201 according to the example embodiments may include an AI model that outputs a response appropriate to the context of a conversation when the context of the conversation is input. The AI model included in the generation model 201 may include an artificial neural network model trained using training set data, and the training set data may include, for example, context for a conversation and a gold response corresponding to the context.

Here, in order to output an appropriate gold response corresponding to context from the context of a conversation, the training set data according to the example embodiments may further include exemplars. That is, the generation model 201 according to the example embodiments may train the AI model by further utilizing exemplars as well as the context of a conversation and a gold response.

Accordingly, the retrieval model 200 according to the example embodiments may generate exemplars according to the example embodiments. The retrieval model 200 may receive context for a conversation and a gold response corresponding to the context, and generate or select an exemplar according to the example embodiments, and the retrieval model 200 may transmit the generated or selected exemplar to the generation model 201 according to the example embodiments as training set data.

The electronic apparatus according to the example embodiments learns to extract a gold response from context of a conversation based on the exemplar-based generation model in which the retrieval model 200 and the generation model 201 are combined. Thus, the electronic apparatus may provide an effect of generating a variety of interesting responses while generating fluent responses suitable for a given conversation context based on abundant knowledge.

Meanwhile, the exemplar-based generative models including the previously existing retrieval and generation models have the following disadvantages.

For example, existing primitive exemplar-based generative models tend to ignore exemplars found by the one-to-many problem in open-domain conversation during response generation. Since the retrieval model extracts an exemplar based on context, even if both a retrieved exemplar and a gold response are similar to a given context, the retrieved exemplar such as that shown as exemplar (a) of FIG. 3, which is different from the gold response, may occur. Since a retrieved exemplar may not help to generate a gold response, the existing generation models are trained to ignore retrieved exemplars and may generate responses using only context.

In order for a generation model to more actively utilize retrieved exemplars, rather than using retrieved exemplars in the training process of the model, in some previous models a gold response or a perturbed gold response has been used as an exemplar. However, if an exemplar $z_i$ and a gold response $r_i$ are excessively similar (for example, exemplar (b) of FIG. 3), the existing exemplar-based generative model may be trained to rely heavily on the exemplar. In this case, consequently, the generation model may generate a response overfitted to the exemplar by directly copying tokens of the exemplar.

In summary, when learning is based on the exemplar-based generative model that combines the above-described existing retrieval model and the existing generation model, there are cases where the generation model ignores given exemplars or derives responses by using given exemplars as they are. For example, if an exemplar selected or identified in the retrieval model has very low relevance to the real context, the generation model may ignore given exemplars and thus not perform appropriate learning. In addition, if an exemplar selected or identified in the retrieval model is highly relevant to the actual context, the generation model may only use and output a given exemplar as is, and thus also not perform appropriate learning.

Specific problems of the exemplar-based generative model including previously existing retrieval and generation models will be described in detail with reference to FIG. 3.

In order to overcome the problems of previously existing exemplar-based generative models including the existing retrieval model and the existing generation model, the retrieval model 200 according to the example embodiments may further include at least one of a response storage 200a, a candidate exemplar identifying part 200b, an exemplar selecting part 200c and a weight calculator 200d.

The response storage 200a may include conversations regarding a plurality of responses. The response storage 200a may store contents of a plurality of responses, or store locations of each response in an embedding space or a value of each response.

The candidate exemplar identifying part 200b may identify one or more candidate exemplars among a plurality of responses stored in the response storage 200a. The candidate exemplar identifying part 200b may identify candidate exemplars using a gold response input as a training set.

Specifically, the candidate exemplars may indicate responses included in a first range from a value (or location) of the gold response in the embedding space. Here, the first range for identifying the candidate exemplars may be determined based on, for example, a clustering algorithm. For example, the candidate exemplars may indicate responses selected from a plurality of responses based on values (or locations) of the gold response in the embedding space and the clustering algorithm (for example, k-means algorithm and k-Nearest Neighbor (kNN) algorithm).

The exemplar selecting part 200c according to the example embodiments may select one or more exemplars from the candidate exemplars identified and selected by the candidate exemplar identifying part 200b. In order for the generation model 201 according to the example embodiments to induce high-efficiency learning based on the exemplars selected in the retrieval model 200, the retrieval model 200 may remove at least one of the exemplars that are too high or low in relevance with respect to the context according to the example embodiments and responses that are too high or low in relevance with respect to the gold response. Accordingly, the exemplar selecting part 200c may select exemplars suitable for learning, from among the candidate exemplars identified and selected from the candidate exemplar identifying part 200b.

An exemplar selected by the exemplar selecting part 200c may be, for example, selected by excluding a value (response) within a second range that is too close (or highly relevant) to a value corresponding to a gold response in the embedding space among candidate exemplars. For example, the second range may indicate a range having a degree of similarity equal to or greater than a certain threshold based on, for example, Jaccard similarity.

The electronic apparatus according to some example embodiments excludes responses within a range that is too close (or highly relevant) to a value corresponding to a gold response in the embedding space from among the candidate exemplars, and thus the electronic apparatus helps the generation model 201 learn to derive a variety of responses appropriate to context.

The retrieval model 200 according to the example embodiments may provide exemplars (or conversation on the exemplars) selected by the exemplar selecting part 200c to the generation model 201 according to the example embodiments.

Further, the generation model 201 according to the example embodiments may learn by using not only selected exemplars but also a weight value(s) related to the exemplars. The weight value(s) associated with exemplars may indicate, for example, a degree to which an exemplar according to the example embodiments is relevant to context and/or a gold response. For example, the weight value(s) may indicate a relevance score or a normalized relevance score for each exemplar.

Accordingly, the retrieval model 200 according to the example embodiments may further include the weight calculator 200d for calculating or deriving a weight value(s) for each exemplar from exemplars selected from the exemplar selecting part 200c. The weight calculator 200d may calculate the weight for each response by calculating a relevance score or a normalized relevance score for each exemplar using selected exemplars according to the example embodiments and/or context according to the example embodiments.

The electronic apparatus according to the example embodiments may induce generating fluent and creative responses and at the same time, provide responses that are appropriate to context and not awkward by appropriately reflecting exemplars, by learning to generate an optimal response through further identifying exemplars and a weight for each exemplar, and may induce a conversation that a user using the conversation model does not get tired of.

The generation model 201 according to the example embodiments may train the artificial neural network model included in the generation model 201 by using the above-described selected exemplars and weight value for each exemplar.

Specifically, the generation model 201 according to the example embodiments may perform forward propagation of the neural network model based on the selected exemplar (and/or a weight value for each exemplar) and generate a response. The generation model 201 according to the example embodiments may provide the generated response to a user.

Also, the generation model 201 according to the example embodiments may generate a loss function using the above-described gold response and the exemplar (and/or the weight value for each exemplar). By performing backpropagation of the artificial neural network model included in the generation model 201 using the generated loss function, update or training of the artificial neural network model may be performed.

The loss function according to the example embodiments may refer to, for example, a function or a value required to perform a backpropagation operation for training a neural network. Accordingly, the loss function according to the example embodiments, for example, for each of exemplars selected by the retrieval model 200, may be determined based on relevance scores (or a normalized relevance score) for each response calculated based on each exemplar and context.

The method of generating conversation using exemplar-based generation model according to the example embodiments includes training the model to extract a response suitable for the context of a conversation based on the combination of the retrieval model 200 and the generation model 201, and there is provided an effect of generating a variety of interesting responses while generating a fluent response suitable for given conversation context based on abundant knowledge.

Meanwhile, the retrieval model 200 according to the example embodiments may be variously referred to as a retriever, etc. Hereinafter, an example of operations of the exemplar selecting part 200c and an example of operations of the weight calculator 200d will be described in detail.

Figure 3:
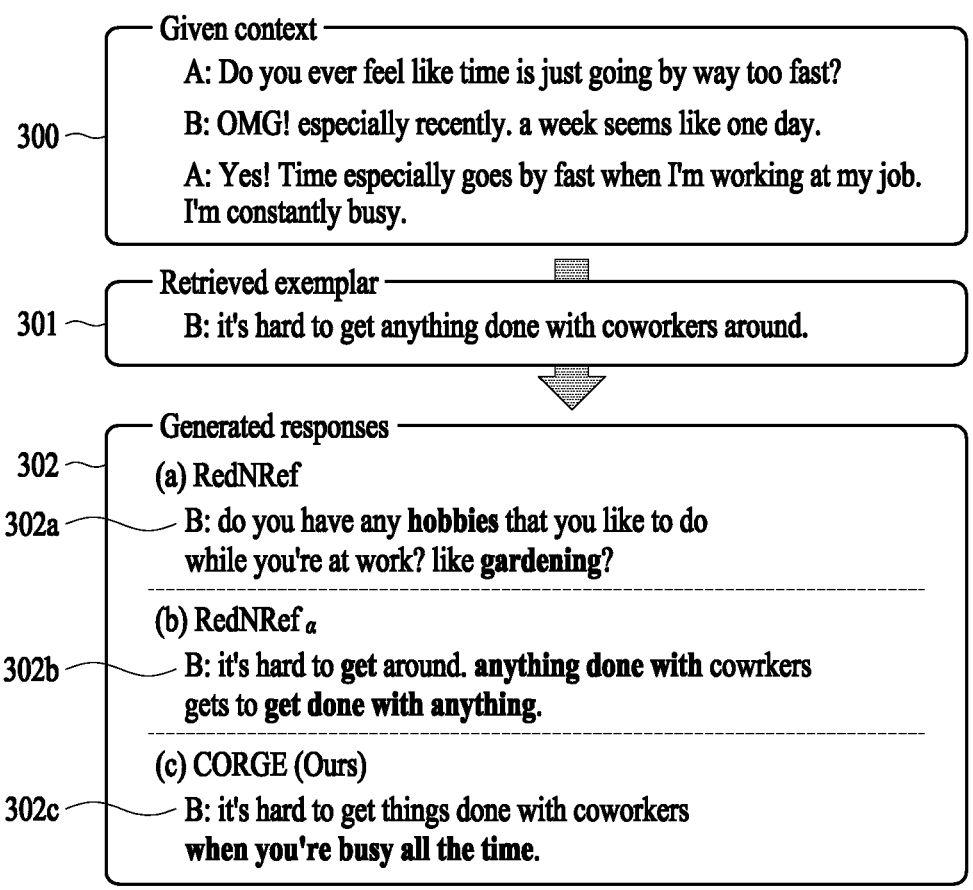
FIG. 3 is a diagram illustrating an example of an overall result of generating a response from context by an electronic apparatus according to example embodiments.

FIG. 3 is a diagram illustrating an example of an overall result of generating responses from context by the electronic apparatus according to the example embodiments.

The operations shown in FIG. 3 are examples of operations of generating responses from conversation obtained from a user, using the retrieval model 200 and the generation model 201 according to the example embodiments trained based on the operations shown in FIG. 2 (for example, the artificial neural network model trained according to the example embodiments).

Specifically, FIG. 3 illustrates that the electronic apparatus according to the example embodiments identifies context from a conversation in operation 300, selects an exemplar(s)

based on context in operation 301, and generates a response corresponding to the conversation by using the selected exemplar(s) in operation 302.

Referring to FIG. 3, the electronic apparatus according to the example embodiments may generate or identify the context in operation 300 by using conversation (or given conversation) which is input from a user. The context may be generated based on one or more conversations (for example, "A: Do you ever feel like time is just going by way too fast?") input from the user, and a response pre-provided to each conversation (for example, "B: OMG!Especially recently. A week seems like one day.").

Referring to FIG. 3, the electronic apparatus according to the example embodiments may retrieve and select an exemplar(s) by using the identified context as a query in operation 301. The operation of selecting the exemplar(s) may be performed, for example, based on some or all operations of the retrieval model 200 of FIG. 2. Referring to FIG. 3, the electronic apparatus according to the example embodiments generates a response to the conversation by using the selected exemplar(s) in operation 302.

Further, in the process of training using the training set data, the generation model according to the example embodiments may be trained in various ways according to the characteristics of the exemplar(s) provided from the retrieval model, the contents of the exemplar(s) and other data provided. Referring to a first exemplar 302a, a second exemplar 302b, and a third exemplar 302c in FIG. 3, the generation model according to the example embodiments may generate a response irrelevant to the context shown in operation 300 and the selected exemplar(s) shown in operation 301 as in the first exemplar 302a, or may generate a response that is excessively identical to the selected exemplar shown in operation 301 as in the second exemplar 302b.

When the exemplar(s) selected and provided by the retrieval model is quite far from a gold response (that is, when the difference in values in an embedding space is large), as in the first exemplar 302a described above, the electronic apparatus may erroneously learn to derive a response that is not related to the conversation. In addition, when the exemplar(s) selected and provided by the retrieval model is very similar to the gold response (that is, when the difference in values in the embedding space is very small), the electronic apparatus may erroneously learn to derive the gold response as is, as in the second exemplar 302b described above. That is, there is a so-called one-to-many problem, in which various exemplars may be selected from one context, and differences in similarity may occur even within the selected exemplars, and thus the learning effect of the artificial neural network is lowered, and at the same time, the possibility of causing an overfitting problem may increase.

Accordingly, the electronic apparatus according to the example embodiments may select the exemplar(s) based on a particular method to generate a response to ensure fluency and continuity of the conversation, as the third exemplar 302c.

The method of generating conversation using exemplar-based generation model may provide an effect of generating a variety of interesting responses while generating fluent responses suitable for given conversation context based on abundant knowledge.

Figure 4:
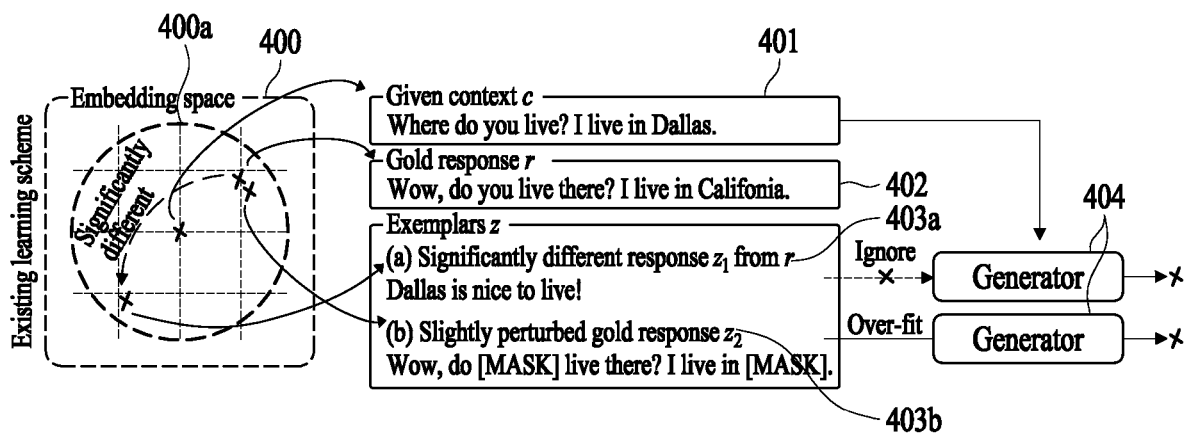
FIG. 4 illustrates examples of operations in which an electronic apparatus according to example embodiments trains a generation model to generate a response from context.

FIG. 4 illustrates examples of operations in which the electronic apparatus according to the example embodiments trains the generation model to generate a response from context.

Specifically, FIG. 4 illustrates some or all of operations in which the electronic apparatus according to the example embodiments learns an exemplar(s) to generate a response from a conversation. The operations shown in FIG. 4 may be performed by the retrieval model 200 and the generation model 201 in the electronic apparatus of FIG. 2.

The context according to the example embodiments may be embedded and corresponds to a specific value in an embedding space 400. Further, a plurality of responses according to the example embodiments (for example, responses stored in the response storage 200a of FIG. 2) may be embedded as specific values in the embedding space 400. For example, the response storage 200a of FIG. 2 may store the specific values in which each response is embedded in the embedding space 400.

The electronic apparatus according to the example embodiments may retrieve a response(s) within a specific range 400a from a value in an embedding space corresponding to the context among a plurality of responses. The electronic apparatus according to the example embodiments may select at least one of a first exemplar 403a and a second exemplar 403b to be provided to the generation model from among the responses within the specific range 400a. Further, the electronic apparatus according to the example embodiments may identify a gold response 402 included in the training set data.

Further, in the process of training the training set data, referring to the first exemplar 403a and the second exemplar 403b in FIG. 4, the generation model according to the example embodiments may select an exemplar irrelevant to the gold response 402 as the first exemplar 403a. In addition, as in the second exemplar 403b, a response that is excessively identical to the selected gold response 402 may be selected.

A generation model 404 of the electronic apparatus according to the example embodiments may perform calculation with respect to the loss function based on the gold response and selected exemplars to train the artificial neural network model in the generation model 404, and the electronic apparatus may train the artificial neural network in the generation model 404 by performing backpropagation of the artificial neural network in the generation model 404 based on the loss function.

However, when the first exemplar 403a is selected as an exemplar, the generation model 404 may ignore the exemplar due to a large difference from the gold response. On the other hand, when the second exemplar 403b is selected as an exemplar, the generation model 404 overweights the exemplar with a very small difference from the gold response, and an overfitting phenomenon may occur. Accordingly, the electronic apparatus according to the example embodiments may select an exemplar(s) based on a specific method to generate a response to ensure fluency and continuity of conversation.

Figure 5:
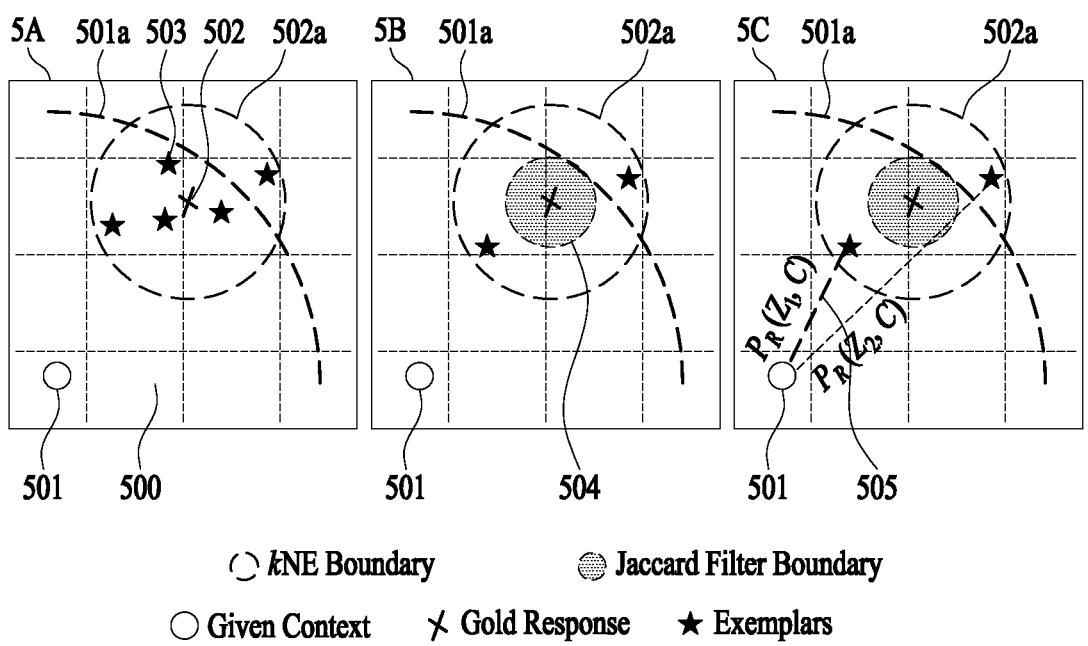
FIG. 5 illustrates an example of an operation of a retrieval model according to example embodiments.

FIG. 5 illustrates an example of an operation of the retrieval model according to the example embodiments.

FIG. 5 illustrates a method of selecting an exemplar(s) ($Z_i = \{z_{i,1}, z_{i,2}, \ldots, z_{i,k}\}$) from a plurality of responses by the retrieval model according to the example embodiments of FIGS. 3 and 4.

Referring to FIG. 5, the retrieval model according to the example embodiments may perform one or more operations among an operation of identifying candidate exemplars from a gold response (5A), an operation of selecting an exemplar(s) from the candidate exemplars (5B) and an operation of calculating the weight for each selected exemplar (5C). In FIG. 5, for example, operation 5A may be performed by the candidate exemplar identifying part 200b of FIG. 2, operation 5B may be performed by the exemplar selecting part 200c of FIG. 2, and operation 5C may be performed by the weight calculator 200d of FIG. 2.

Referring to operation 5A of FIG. 5, the retrieval model according to the example embodiments may identify context 501, and identify candidate exemplars 503 that exist within a relevance range 501a in an embedding space 500 from the context 501 or within a first range 502a in the embedding space 500 from a gold response 502. The first range 502a according to the example embodiments may indicate a range determined based on a clustering algorithm (for example, k-means algorithm and kNN algorithm).

The electronic apparatus according to the example embodiments may select candidate exemplars based on the clustering algorithm, and may prevent the ultimately selected exemplars from being ignored or underfitting from occurring. In addition, with this operation, since the selected exemplars are not ignored, unnecessary delay in the learning process may be reduced.

Referring to operation 5B of FIG. 5, the retrieval model according to the example embodiments may exclude exemplars included in a second range 504 from among the selected candidate exemplars 503. Here, the second range 504 may be a range determined by a user or a system. For example, the second range 504 may indicate Jaccard Filter Boundary in the embedding space.

The electronic apparatus according to the example embodiments may prevent learning from a response excessively similar to a gold response by excluding such exemplars, and thus the electronic apparatus may ultimately prevent an overfitting phenomenon.

Further, selected exemplars in operations 5A and 5B may have high relevance to a gold response, but may have different relevance to context according to the example embodiments. For example, the exemplars selected in operations 5A and 5B may have high relevance to context but may have low relevance to the gold response, according to the characteristics of the clustering algorithm (for example, k-Nearest Exemplars (kNE)) performed in operation 5A, or may have low relevance to the context but may have high relevance to the gold response. The electronic apparatus according to the example embodiments may train the generation model in consideration of relevance between each exemplar and context. If the retrieval model were to perform only operations 5A and 5B described above, selected exemplars may include responses that depend entirely on a gold response, and thus learning efficiency may be reduced.

Accordingly, referring to operation 5C of FIG. 5, the retrieval model according to the example embodiments may calculate the degree of similarity (for example, weight) between each exemplar and context. The weight according to the example embodiments may indicate the similarity between one exemplar and context, and the similarity may be calculated, for example, based on differences in values in an embedding space. The retrieval model according to the example embodiments may calculate as many weight values as the number of exemplars by using context, and the retrieval model may map each calculated weight value to each exemplar and provide the value to the generation model according to the example embodiments.

Specifically, the retrieval model ($\mathcal{R}$) according to the example embodiments may calculate a relevance score ($S_{\mathcal{R}}(z_{i,j}, c_i)$) for each exemplar based on selected exemplars ($z_{i,j}$) and context ($c_i$) according to the example embodiments. Furthermore, the retrieval model according to the example embodiments may calculate a normalized relevance score ($P_{\mathcal{R}}(z_{i,j}, c_i)$) by, for example, applying Softmax function to the relevance score ($S_{\mathcal{R}}(z_{i,j}, c_i)$) for each exemplar. Thereafter, the electronic apparatus according to the example embodiments may convert the traditional likelihood into the weighted likelihood by using normalized relevance scores for each of the exemplars, and train the generation model according to the example embodiments to minimize the loss function generated from the converted weight likelihood. In order to train the generation model according to the example embodiments, the loss function (L) generated from the converted weight likelihood may be calculated, for example, as follows.

[Equation 1]

$$L = \sum_{i=1}^{n} L(r_i, c_i) \quad (1)$$
$$L(r_i, c_i) = -\log \sum_{z \in Z_i} P_{\mathcal{R}}(z, c_i) P_{\mathcal{G}}(r_i | c_i, z)$$

The generation model ($\mathcal{G}$) according to the example embodiments may perform a backpropagation operation, using the calculated loss function (L). A gradient, that is, a gradient calculated in the process of performing the backpropagation operation according to the example embodiments, may be calculated, for example, as follows.

[Equation 2]

$$\nabla_{\mathcal{G}} L(r_i, c_i) = -\alpha \cdot \sum_{z \in Z_i} P_{\mathcal{R}}(z, c_i) \nabla_{\mathcal{G}}(P_{\mathcal{G}}(r_i | c_i, z)), \quad (2)$$
$$\text{where } \alpha^{-1} = \sum_{z \in Z_i} P_{\mathcal{R}}(z, c_i) P_{\mathcal{G}}(r_i | c_i, z)$$

Equation 2 as an example shows that the gradient of the generation model is scaled by the normalized relevance score ($P_{\mathcal{R}}(z, c_i)$), and when a selected exemplar(s) z has little relevance to the context ($C_i$), the generation model is updated less (that is, trained to change less).

The electronic apparatus according to the example embodiments may induce learning by ignoring or considering less an inappropriate or irrelevant exemplar(s) by the operations of the retrieval model and the generation model described above. In addition, with this configuration, the electronic apparatus may train the generation model to easily fetch tokens from an exemplar relevant to a gold response.

FIG. 6 illustrates an example of a result of an operation for learning a conversation and a response of the retrieval model according to example embodiments.

Specifically, FIG. 6 shows an example of an operation for learning a conversation and a response of the retrieval model according to the example embodiments shown in FIG. 5. Referring to FIG. 6, the retrieval model according to the example embodiments may identify context 600 and a gold response 601 using conversation.

Referring to FIG. 6, a dashed box 602 may indicate a candidate exemplar retrieved by the retrieval model through a query for context among a plurality of responses according to the example embodiments. Referring to FIG. 6, a dashed box 603 may indicate a candidate exemplar(s) extracted based on a clustering algorithm (for example, kNE) according to the example embodiments. In the dashed boxes 602 and 603, "Sim" may indicate a literal similarity between the gold response and each candidate exemplar. $P_{\mathcal{R}}(z, c)$ may represent a normalized relevance score for each response calculated by the retrieval model according to the example embodiments. Use? indicates whether the electronic apparatus according to the example embodiments provides the exemplar to the generation model for training of the generation model.

Figure 7:
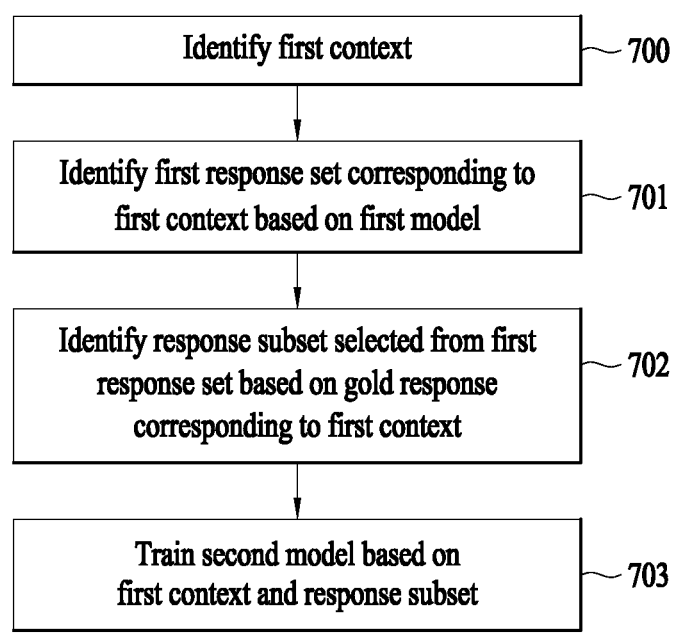
FIG. 7 is a flowchart illustrating an example of operations of an electronic apparatus according to example embodiments.

FIG. 7 is a flowchart showing an example of operations of the electronic apparatus according to the example embodiments.

Some or all of the operations shown in FIG. 7 may be performed by, for example, the processer 110 of FIG. 1 or a learning processor included in the processor 110, or may be performed by the retrieval model 200 and/or the generation model 201 of FIG. 2.

Referring to FIG. 7, the electronic apparatus according to the example embodiments may identify a first context in operation 700. Referring to FIG. 7, the electronic apparatus according to the example embodiments may identify a first response set corresponding to the first context based on a first model in operation 701. The first response set referenced in FIG. 7 may indicate exemplars included in the relevance range 501a shown in FIG. 5. The first context according to the example embodiments may include one or more conversations obtained from a user.

Referring to FIG. 7, the electronic apparatus according to the example embodiments may identify a response subset selected from the first response set based on an appropriate response (for example, the gold response) corresponding to the first context in operation 702. The response subset shown in FIG. 7 may indicate a candidate response set according to the example embodiments. For example, the response subset shown in FIG. 7 may represent responses other than exemplars included in the second range 504 (among which is included the gold response 502) of FIG. 5.

The response subset according to the example embodiments may be selected from among candidate responses identified based on a gold response and the clustering algorithm according to the example embodiments. In addition, the response subset according to the example embodiments may be selected by excluding at least one corresponding response within a specific range from a value corresponding to the gold response in an embedding space among candidate responses.

Referring to FIG. 7, the electronic apparatus according to the example embodiments may train the second model based on the first context and the response subset in operation 703.

The electronic apparatus according to the example embodiments may further include setting a weight for each response included in the response subset based on the first context. Herein, the electronic apparatus according to the example embodiments may train the second model based on a set of weights, wherein each weight in the set of weights corresponds to a response.

The weight according to the example embodiments may be set based on a relevance score for each response in the response subset, and a relevance score for a response may be calculated based on a value corresponding to the first context and a value corresponding to the response in an embedding space.

Further, the second model according to the example embodiments may identify a second context on a conversation obtained from a user, and provide a gold response for the second context based on the second context.

The second model according to the example embodiments may be trained by performing a backpropagation operation using a loss function calculated based on a set of weights, where each weight in the set of weights may be calculated by normalizing a relevance score for each response.

In the method of generating conversation using exemplar-based generation model according to the example embodiments, by learn to extract a response suitable for the context of a conversation based on the combination of the retrieval model 200 and the generation model 201, the electronic apparatus may provide an effect of generating a variety of interesting responses while generating fluent responses suitable for given conversation context based on abundant knowledge.

The electronic apparatus according to the example embodiments excludes responses within a range that is too close (or highly relevant) to a value corresponding to a gold response in the embedding space from among the candidate exemplars, and thus the electronic apparatus helps the generation model 201 learn to derive a variety of responses appropriate to context.

The electronic apparatus according to the example embodiments may induce generating fluent and creative responses and at the same time, provide responses that are appropriate to context and not awkward by appropriately reflecting exemplars, by learning to generate an optimal response by further identifying exemplars and a weight for each exemplar, and may induce a conversation that a user using the conversation model does not get tired of.

Figure 8:
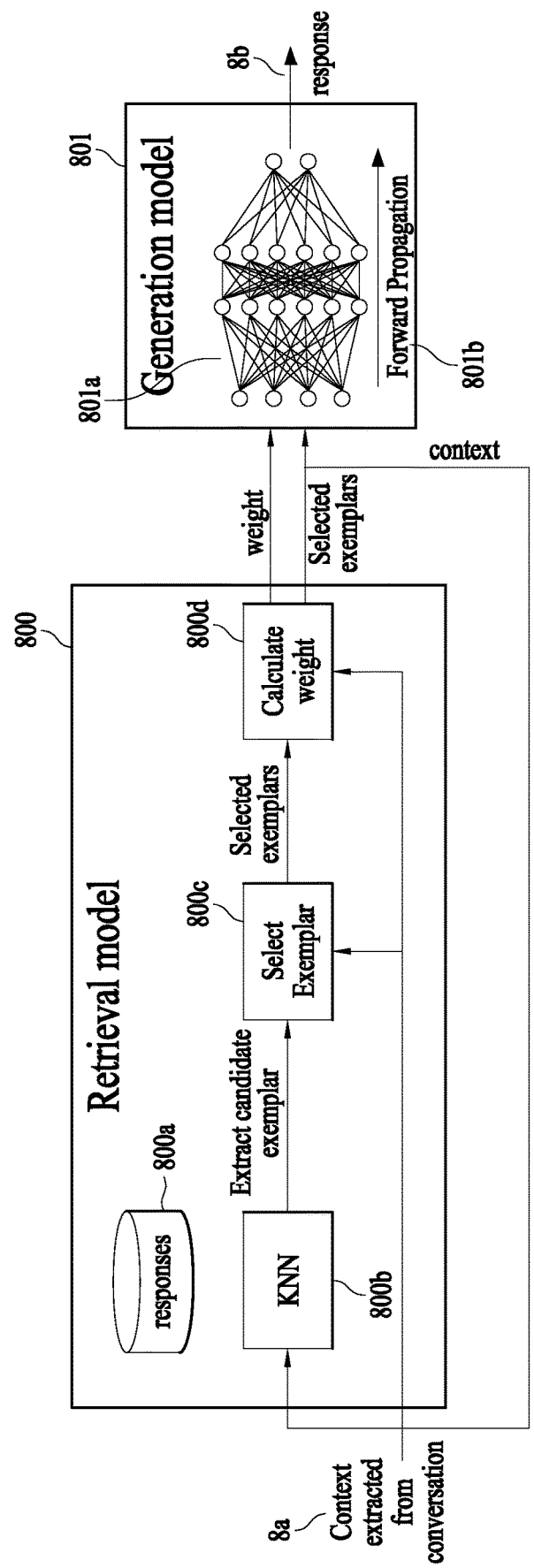
FIG. 8 illustrates an example of an operation of the electronic apparatus according to the example embodiments.

FIG. 8 illustrates an example of an operation of the electronic apparatus according to the example embodiments.

Specifically, FIG. 8 illustrates an example of an operation of the conversation electronic apparatus according to the example embodiments performing open-domain conversation. For example, the operation of FIG. 8 may represent an example of an operation for extracting a response from a conversation input from an actual user, rather than a learning process to extract a response from training data.

Referring to FIG. 8, the electronic apparatus according to the example embodiments may receive a conversation from a user. The electronic apparatus according to the example embodiments may extract context 8a from the received conversation. The context 8a according to the example embodiments may be extracted by the processor 110 in the electronic apparatus or a learning processor included in the processor 110, and the context 8a may indicate the context according to the example embodiments described above with reference to FIGS. 2 to 7.

The electronic apparatus according to the example embodiments may further include at least one of a retrieval model 800 and a generation model 801, and each element may indicate for example the retrieval model 200 or the generation model 201 referenced with respect to FIGS. 2 to 7.

The electronic apparatus according to the example embodiments may receive the context 8a extracted from the conversation input from the user, and generate a response 8b appropriate to the conversation. Therefore, the electronic apparatus may transmit the context 8a to the retrieval model 800. A KNN part 800b in the retrieval model 800 according to the example embodiments may extract candidate exemplars, based on the context 8a according to the example embodiments and a plurality of responses stored in an exemplar storage 800a in the retrieval model 800. An exemplar selecting part 800c in the retrieval model 800 according to the example embodiments may select one or more of extracted candidate exemplars. A weight calculating part 800d of the retrieval model 800 according to the example embodiments may calculate weight (or calculate a relevance score) from the selected one or more candidate exemplars. The retrieval model 800 according to the example embodiments may transmit the selected exemplars to the generation model 801 according to the example embodiments. The generation model 801 according to the example embodiments may receive the selected exemplars and the context 8*a* according to the example embodiments. The generation model 801 may input the selected exemplars and the context 8*a* on an input layer of an artificial neural network model 801*a* included in the generation model 801, and the generation model 801 may generate and identify the response 8*b* from an output layer. The generation model 801 may output the response 8*b* identified from the output layer and provide the response 8*b* to a user.

The artificial neural network model 801*a* included in the generation model 801 may perform a forward propagation operation 801*b*, using the selected exemplars which are input on the input layer and the context 8*a* according to the example embodiments.

Further, in order to induce an immediate and real-time conversation, the generation model 801 according to the example embodiments may extract the response 8*b* from the conversation input from the user, and may omit a backpropagation process (and/or a calculating operation with respect to the loss function according to the example embodiments) according to the example embodiments. Further, if the backpropagation process (and/or the calculating operation with respect to the loss function according to the example embodiments) is omitted, the artificial neural network model 801*a* of the generation model 801 according to the example embodiments is not then being trained, but instead, an immediate response may be extracted from the conversation which is input from the user, and thus it may be an example embodiment of the electronic apparatus described in this specification. Therefore, since certain embodiments of the invention omit the backpropagation process (and/or a calculating operation with respect to the loss function according to the example embodiments), the backpropagation process and/or the calculating operation with respect to the loss function described in this specification should not be construed as a conventional or routine configuration.

FIGS. 9 to 12 illustrate comparisons of performances of an open-domain conversation model of the electronic apparatus according to the example embodiments, to performances of other open-domain conversation models.

FIG. 9 illustrates the effect of the electronic apparatus according to the example embodiments.

Referring to FIG. 9, "Bi-encoder 256M" and "Blender 90M" may be examples of a baseline retrieval model and a baseline generation model. Referring to FIG. 9, "RetNRef," "RetNRef_α" and "MatToGen" are examples of the generation model according to the example embodiments, and "CORGE" indicates the retrieval model according to the example embodiments. Specifically, RetNRef is, for example, an example of the generation model to generate a response, and may connect the context given as an input to the retrieval model. RetNRef_α is a conversational retrieval version of RetNRef, and may contain configurations that employ mixed configurations to avoid simply ignoring retrieved exemplar (α=0:5). MatToGen may be a model that extracts meaningful tokens from an exemplar(s) and provides the tokens to the generator. In FIG. 9, RAG and KIF represent open-domain conversational models based on a knowledge-grounded generation model. FIG. 9 shows an experiment by combining "RetNRef," "RetNRef_α" and "MatToGen" with the electronic apparatus according to the example embodiments (or the retrieval model of the electronic apparatus) and comparing the performances of the combined models.

"Appropriateness" of FIG. 9 may indicate an index measuring how fluent and logical a response is and how well it fits with context, and "Informativeness" may refer to an index measuring how meaningful the information included in a generated response is based on context.

FIG. 9 is a summary of the comparison results of the combined models. When RetNRef and MatToGen adopt the retrieval model according to the example embodiments (as indicated by "CORGE"), with regard to the informativeness, effects beyond all baselines are demonstrated except in the case of RetNRef+CORGE verses KIF. Specifically, RetNRef+CORGE and MatToGen+CORGE, combined with the retrieval model according to the example embodiments, outperform RetNRefα and MatToGen in both metrics, respectively. In particular, it may be identified that MatToGen+CORGE outperforms Biencoder 256M and significantly outperforms Blender 90M, whereas MatToGen performs worse than Bi-encoder 256M and Blender 90M. In addition, RefNRef+CORGE outperforms Blender 90M. The evaluation result shows that the CORGE model, as an example of the retrieval model according to many embodiments of the invention, leads the existing model-based generative models to generate a more fluent and informative generation model.

FIG. 10 illustrates effects of the electronic apparatus according to the example embodiments.

FIG. 10 shows PPL (Perplexity) and Dist-n and BLEU, which are automatic evaluation metrics for the electronic apparatus according to the example embodiments, for analyzing responses generated by each model.

PPL is an index that indicates how well a model predicts a response based on presented input context, and a low PPL indicates that the model predicts a response well. In order to analyze how much the exemplar-based generation model utilizes retrieved exemplars, two modified indexes of PPL using conditional probability may be used when exemplars are provided. First, 1) $PPL_{gold}$ uses conditional probability $P\mathcal{G}(r|c,r)$, assuming a situation when a gold response is given as an exemplar. Second, 2) $PPL_{retrieve}$ uses conditional probability $P\mathcal{G}(r|c,r)$, where z indicates an exemplar retrieved using $S_{\mathcal{R}}j(z,r)$. When $PPL_{gold}$ is small, it indicates that the exemplar-based generation model predicts a gold response well when the gold response is provided as an exemplar. $PPL_{retreive}$ being small indicates that the exemplar-based generation model makes good use of a provided exemplar to predict a gold response.

Dist-n indicates the ratio of the total number of n-grams for all generated responses to distinct n-grams, and may be an index that indicates diversity of generated responses.

BLEU may be an index for indicating the degree of token overlap between a provided exemplar and a generated exemplar pair (z, r). A high BLEU score indicates that the generation model copied or referenced many parts from the provided exemplar in generating a response.

Referring to FIG. 10, the configuration in which RetNRef and the retrieval model of the electronic apparatus according to the example embodiments are combined, and the configuration in which MatToGen and the retrieval model of the electronic apparatus according to the example embodiments are combined, show lower PPL_retrieve than Blender 90M. This indicates that the exemplar-based generation model trained with the retrieval model of the electronic apparatus according to the example embodiments predicts a gold response better than Blender 90M, using provided exemplars. The configuration in which RetNRef and the retrieval model of the electronic apparatus according to the example embodiments are combined is smaller in degree of PPL- _gold and PPL_retrieve than RetNRef, and from this, it may be inferred that the configuration in which RetNRef and the retrieval model of the electronic apparatus according to the example embodiments are combined utilizes provided exemplars better than RetNRef.

RetNRef has a lower PPL_gold than the configuration in which RetNRef and the retrieval model of the electronic apparatus according to the example embodiments are combined, but RetNRef has a higher PPL_retrieve than the configuration in which RetNRef and the retrieval model of the electronic apparatus according to the example embodiments are combined. The result shows that RetNRef does not utilize retrieved exemplars very well, except when a gold response is provided as an exemplar. According to this observation, it may be inferred that RetNRef generates a response that is highly overfitted to a selected exemplar resulting from using a gold response as an exemplar in the training process. In addition, the model of the electronic apparatus according to the example embodiments alleviates the overfitting problem, and this is also shown in the combination with MatToGen. When compared to Blender 90M, higher Dist-n values of the configuration in which RetNRef and the retrieval model of the electronic apparatus according to the example embodiments are combined, and the configuration in which MatToGen and the retrieval model of the electronic apparatus according to the example embodiments are combined, indicate that the model of the electronic apparatus according to the example embodiments generates more diverse responses than a vanilla-generation model. Further, since the configuration in which RetNRef and the retrieval model of the electronic apparatus according to the example embodiments are combined has a higher Dist-n than RetNRef, utilizing an exemplar may help the generator diversify responses. RetNRef$\alpha$ alone is the only model that achieves Dist-n comparable to Bi-encoder 256M which is a vanilla retrieval model, but considering the gap between its PPL_gold and PPL_retrieve results, it may be identified that the appropriateness and informativeness are poor due to overfitting to an exemplar.

Since the average BLEU score implicitly indicates the overlap between a retrieved exemplar and a generated response, it is identified that the higher the BLEU level, the more dependent the generator is on a retrieved exemplar. Since RetNRef shows negligible BLEU scores, it is reaffirmed that the model is making little use of the retrieved exemplar. Further, RetNRef$\alpha$ and MatToGen respectively have higher BLEU scores compared to the configuration in which RetNRef and the retrieval model of the electronic apparatus according to the example embodiments are combined and the configuration in which MatToGen and the retrieval model of the electronic apparatus according to the example embodiments are combined. Therefrom, it is identified that the configuration of the electronic apparatus according to the example embodiments depend less on exemplars retrieved by the retrieval model.

FIG. 11 is an example of the effects according to the above-described result.

Illustrated are responses generated with regard to input context by Bi-encoder 256M, Blender 90M, RetNRef, RetNRef$\alpha$, the configuration in which RetNRef and the retrieval model of the electronic apparatus according to the example embodiments are combined, KIF and RAG.

Figure 12:
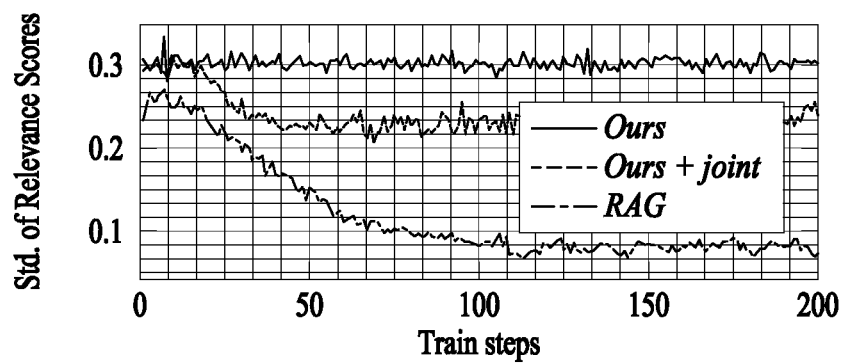
Figure 13:
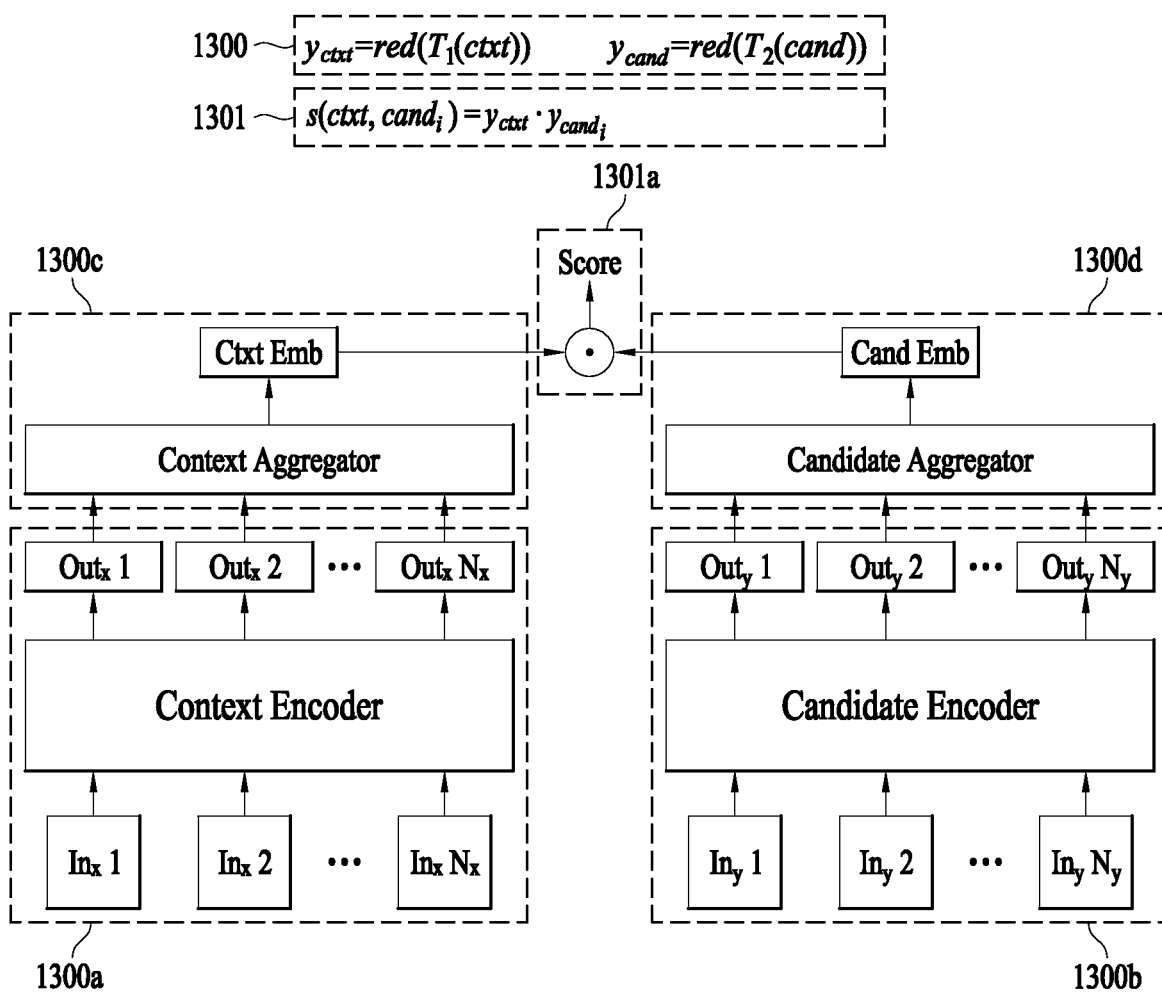
FIG. 13 illustrates an example of a method of calculating a relevance score according to the example embodiments.

FIG. 12 illustrates effects according to the above-described results of the model of the electronic apparatus according to the example embodiments compared to a knowledge-grounded generation model.

Specifically, the standard deviation of normalized retriever scores becomes smaller when the retriever is jointly trained with regard to exemplar-based generation models. Herein, five samples (k=5) are used for each training instance. "Ours" in FIG. 12 indicates RetNRef+CORGE, and "joint" indicates the retrieval model and the generation model training together.

Further, knowledge-grounded generation is described.

Knowledge-grounded generation models using retrieved results (for example, related articles identified from Wikipedia) to generate responses are proposed to perform a knowledge-intensive natural language processing (NLP) task (for example, open-domain questioning and responding). Knowledge-grounded generation is similar to exemplar-based generation. However, the main difference is that knowledge-grounded generation models extract knowledge from external sources to generate a response. The effectiveness of pre-training a knowledge extractor with a large-scale language model for responding to open-domain questions has been shown. Knowledge-grounded generation models have also been shown to generate more informative and diverse sentences compared to pure generation models in various aspects of knowledge-intensive NLP tasks. Knowledge-grounded generation models have similarly been proposed for generating responses, but the knowledge-grounded generation model is not focused on open-domain conversations. In this specification, it is shown that existing knowledge-grounded generation models may not be directly applied to open-domain conversations.

The automatic evaluation results according to FIG. 10 may indicate that the knowledge-grounded generation models ignore exemplars. PPLgold, PPLretrieve and Dist-n for RAG and KIF are similar to those of Blender 90M, and this indicates that no useful information is provided while an exemplar generates a response. Further, the low average BLEU score indicates that there is little overlap between a retrieved exemplar and a generated response. The result stems from the difference between an open-domain conversation and knowledge-grounded generation tasks. While learning and being trained with the knowledge-grounded generation models, $P_{\mathcal{R}}(z,c)$ is used to bring in external knowledge, but due to the one-to-many feature of open-domain conversations, the generator may ignore an exemplar retrieved again as a default exemplar.

Further, when the retrieval model (retriever) according to the example embodiments is trained together with the generator, the retriever is trapped in a local minimum value. When a retriever of RAG is jointly trained, the standard deviation of normalized relevance scores $P_{\mathcal{R}}(z,c)$ calculated by the retriever approaches almost zero (0). It indicates that the smaller the standard deviation is, the flatter the relevance scores get. It has been empirically shown that a knowledge-grounded generation model improves performance in knowledge-intensive NLP tasks by jointly training the retriever and the generator, but exemplars retrieved from open-domain conversations are ignored. Therefore, the retriever learns how to generate a relevance score without information. As a result, the retriever may be minified, causing the retriever to return an inappropriate type to the generator (as shown in the examples of KIF and RAG). When the retrieval model is trained together with the electronic apparatus according to the example embodiments, the retriever scores become flat, and as experienced in RAG, minor disruptions of the retriever may be observed empirically. Therefore, the electronic apparatus according to the example embodiments may not jointly train the retrieval model. As the knowledge-grounded generation models have shown empirically, the retriever and the generator that are trained in combination improve performances in knowledge-intensive NLP tasks, but retrieved exemplars are ignored in open-domain conversations, and thus the retriever generates a non-informative relevance score.

Hereinafter, an ablation study (an ablation training verification) of the retrieval model of the electronic apparatus disclosed in the present specification (indicated as "CORGE") will be described.

In the specification, it is shown that a relevance score (RS) and the kNE clustering algorithm induce the generator to actively utilize exemplars and Jaccard Filter (JF) to alleviate the overfitting problem. As seen in FIG. 10, the PPL_retrieve of RetNRef+CORGE is low compared to other restrained comparison groups, and this shows that each element contributes to generating a response. RetNRef+CORGE–RS and RetNRef+CORGE–kNE show high results for PPL_retrieve and PPL_gold, indicating that in the process of generating a response, RS and kNE help the generator to utilize an exemplar. RetNRef+CORGE–JF provides a strong signal for overfitting, and shows a significantly lower value for PPL_gold, but in contrast, shows high PPL_retrieve values. Dist-n indicates that the model proposed in this specification generates the most diverse responses among the models except RetNRef+CORGE–JF, and RetNRef+CORGE–JF indicates excessive copying of tokens from a retrieved exemplar. The average BLEU score shows the same tendency, reaffirming the configuration of the CORGE.

In conclusion, the specification proposes a training model applicable to an exemplar-based generation model that may maximize performance in terms of appropriateness and informativeness. The training method according to many embodiments of the invention may alleviate the disadvantages of existing exemplar-based generative models, by selecting exemplars that are semantically similar but reasonably distant from a gold response and by applying weight to the exemplars in a retriever based on a relevance score. Through extensive analysis including pairwise human evaluation, it is identified that this training method can improve upon the performance of existing exemplar-based generative models.

FIG. 13 illustrates an example of a method of calculating a relevance score according to the example embodiments.

First, encoded vectors (for example, vectors encoded by operations of encoders $1300a$ and $1300b$ included in the electronic apparatus according to the example embodiments, as shown in FIG. 13) of input context (for example, context according to the example embodiments) and a candidate label (for example, an exemplar according to the example embodiments and/or a selected exemplar) are identified. For example, an encoded vector $y_{ctxt}$ of the input context and an encoded vector $y_{cand}$ of the candidate label may be represented as indicated by reference numeral $1300$ of FIG. 13.

Herein, $T_1$ and $T_2$ may refer to two transformers for which the operations shown in FIG. 13 and described with reference to FIG. 13 are pre-trained, and $T_1$ and $T_2$ may initially start with the same weight but may be updated during a fine tuning process. $T(x)=h_1, \ldots h_N$ may indicate an output result of each transformer T, and red(•) may indicate a function that reduces a sequence of vectors to one vector. The input context and the candidate label are each encoded separately, and thus each segment token is zero. Similar to what was done during the pre-training, both the input and the label are surrounded by a special token [S], and thus h1 may correspond to [S]. The function red(•) for reducing the sequence of vectors to one vector may include, for example, one or more of the following methods: 1) a method of selecting a first output of a transformer (corresponding to the special token [S]) and 2) a method of determining an average of initial output vectors in the number of m<N, or an average of all output vectors. $T_1$ and $T_2$ according to FIG. 13 may include some or all configurations shown in $1300c$ and $1300d$ of FIG. 13.

A score of the candidate label $cand_i$ may be calculated by the dot product as shown in the equation as indicated by reference numeral $1301$ of FIG. 13 and as indicated by reference numeral $1301a$ of FIG. 13. Herein, with respect to a network (for example, the network described with regard to FIG. 13), each logit is $y_{ctxt} \cdot y_{cand_1}, \ldots, y_{ctxt} \cdot y_{cand_n}$ $cand_1$ is a correct label and the rest are cases that may be selected from a training set, and the network may be trained to minimize cross-entropy loss.

Accordingly, the relevance score according to the example embodiments may indicate a score of the candidate label, wherein the score is calculated by using the context according to the example embodiments as an input context and an exemplar according to the embodiments as the candidate label. Further, the relevance score according to the example embodiments may indicate a score generated by an encoder(s) such as a Bi-encoder and a Poly-encoder).

A recording medium according to the various example embodiments of the present disclosure may include a computer-readable non-transitory recording medium in which a program for executing a method of generating conversation using an exemplar-based generation model in a computer is recorded.

Further, the present specification and drawings disclose preferred example embodiments, and certain terms are used. However, the terms are only used in a general sense to easily describe the technical content of the present disclosure and to help the understanding of the present disclosure, and are not intended to limit the scope of the present disclosure. It would be apparent to those of ordinary skill in the art to which the present disclosure pertains that other modifications based on the technical spirit of the present disclosure may be implemented in addition to the example embodiments disclosed herein.

The electronic apparatus or terminal according to the example embodiments may include a processor, a memory for storing and executing program data, a permanent storage such as a disk drive, a communication port for communicating with an external device, and a user interface device such as a touch panel, a key and a button. Methods implemented as software modules or algorithms may be stored in a computer-readable recording medium as computer-readable codes or program instructions executable on the processor. Herein, the computer-readable recording medium may be a magnetic storage medium (for example, read-only memory (ROM), random-access memory (RAM), a floppy disk, hard disk, etc.) and an optical readable medium (for example, CD-ROM and a digital versatile disc (DVD)). A computer-readable recording medium may be distributed among network-connected computer systems, so that the computer-readable code may be stored and executed in a distributed manner. The medium may be readable by a computer, stored in a memory and executed on a processor.

The example embodiments may be represented by functional block configurations and various processing steps. The functional blocks may be implemented in any number of hardware and/or software configurations that perform specific functions. For example, an example embodiment may adopt integrated circuit configuration such as a memory, processing, a logic, look-up tables, executing various functions under the control of one or more microprocessors or other control devices. Similar to that configurations may be executed as software programming or software configurations, the example embodiments may be implemented in a programming such as C, C++, Java, assembler, etc. or scripting language including various algorithms implemented as combinations of data structures, processes, routines, or other programming configurations. Functional aspects may be implemented in an algorithm running on one or more processors. Further, the example embodiments may adopt the prior art for electronic environment setting, signal processing and/or data processing. Terms such as "mechanism," "element," "means" and "configuration" may be used broadly, and are not limited to mechanical and physical elements. The terms may include the meaning of a series of routines of software in association with a processor.

The above-described example embodiments are merely examples, and other embodiments may be implemented within the scope of the claims described below.

What is claimed is:

1. A method of training a conversation model in an electronic apparatus, the method comprising:
   identifying a first context;
   identifying a first response set corresponding to the first context based on a first model;
   excluding, from the first response set, at least one response that exists outside a first range in an embedding space from a gold response corresponding to the first context, wherein the first range is determined based on a k-means algorithm or a k-Nearest Neighbor (kNN) algorithm;
   excluding, from the first response set, at least another response that is included in a second range in the embedding space from the gold response, wherein the second range indicates a Jaccard Filter Boundary in the embedding space;
   identifying a response subset including a plurality of responses selected from the first response set based on the gold response;
   calculate relevance scores, each relevance score indicating a degree of relevance to the gold response for a response in the plurality of responses; and
   training a second model based on the first context, the response subset, and the relevance scores.

2. The method of claim 1, wherein the second model identifies a second context for a conversation obtained from a user, and provides a gold response for the second context based on the second context.

3. The method of claim 1, wherein the first context includes one or more conversations obtained from a user.

4. The method of claim 1, wherein the second model is trained by performing a backpropagation operation using a loss function calculated based on a set of weights, wherein each weight of the set of weights is calculated by normalizing the relevance scores for each response.

5. An electronic apparatus for performing a method of generating a conversation, the electronic apparatus comprising:
   a memory in which at least one program is stored; and
   a processor, wherein the processor is configured to identify a first context;
   identify a first response set corresponding to the first context based on a first model;
   identify a gold response corresponding to the first context based on a second model;
   exclude, from the first response set, at least one response that exists outside a first range in an embedding space from the gold response, wherein the first range is determined based on a k-means algorithm or a k-Nearest Neighbor (kNN) algorithm;
   exclude, from the first response set, at least another response that is included in a second range in the embedding space from the gold response, wherein the second range indicates a Jaccard Filter Boundary in the embedding space;
   identify a response subset including a plurality of responses selected from the first response set based on the gold response;
   calculate relevance scores, each relevance score indicating a degree of relevance to the gold response for a response in the plurality of responses; and
   train the second model based on the first context, the response subset, and the relevance scores.

6. A non-transitory computer-readable recording medium, comprising a medium configured to store computer readable instructions, wherein, when the computer readable instructions are executed by a processor, the processor performs operations comprising:
   identifying a first context;
   identifying a first response set corresponding to the first context based on a first model;
   identifying a gold response corresponding to the first context based on a second model;
   excluding, from the first response set, at least one response that exists outside a first range in an embedding space from the gold response, wherein the first range is determined based on a k-means algorithm or a k-Nearest Neighbor (kNN) algorithm;
   excluding, from the first response set, at least another response that is included in a second range in the embedding space from the gold response, wherein the second range indicates a Jaccard Filter Boundary in the embedding space;
   identifying a response subset including a plurality of responses selected from the first response set based on the gold response;
   calculating relevance scores, each relevance score indicating a degree of relevance to the gold response for a response in the plurality of responses; and
   training the second model based on the first context, the response subset, and the relevance scores.

* * * * *